(12) United States Patent
Azuma

(10) Patent No.: US 7,180,645 B2
(45) Date of Patent: Feb. 20, 2007

(54) QUANTUM-STATE-GENERATING APPARATUS, BELL MEASUREMENT APPARATUS, QUANTUM GATE APPARATUS, AND METHOD FOR EVALUATING FIDELITY OF QUANTUM GATE

(75) Inventor: Hiroo Azuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 10/812,461

(22) Filed: Mar. 29, 2004

(65) Prior Publication Data

US 2005/0133780 A1 Jun. 23, 2005

(30) Foreign Application Priority Data

Apr. 1, 2003 (JP) ............................. 2003-098080

(51) Int. Cl.
*G06E 1/04* (2006.01)
*G06E 3/00* (2006.01)

(52) U.S. Cl. ...................... 359/107; 359/108; 708/191; 708/831

(58) Field of Classification Search ................ 708/191
See application file for complete search history.

(56) References Cited

U.S. PATENT DOCUMENTS

2004/0252732 A1* 12/2004 Ralph ........................... 372/17

OTHER PUBLICATIONS

Neilsen et al, "Quantum Computation and Quantum Information" 2000, Cambridge University Press, p. 532 ISBN 0 521 63235 9.*

Alter et al, "Quantum Measurement of a Single System", 2001 John Wiley & Sons ISBN 0 471 28308 8.*
D. Deutsch and R. Jozsa, "Rapid solution of problems by quantum computation", Proc. R. Soc. London, Ser. A 439, 553-558 (1992).
D.R. Simon, "On the power of quantum computation", SIAM J. Comput. 26, 1474-1483 (1997).
P.W. Shor, "Polynomial-time algorithms for prime factorization and discrete logarithms on a quantum computer", SIAM J. Comput. 26, 1484-1509 (1997).
L.K. Grover, "Quantum mechanics helps in searching for a needle in a haystack", Phys. Rev. Lett. 79, 325-328 (1997).
C.H. Bennett, et al, "Teleporting an unknown quantum state via dual classical and Einstein-Podolsky-Rosen channels",Phys. Rev. Lett. 70, 1895-1899 ( 1993).

(Continued)

*Primary Examiner*—Jerome Jackson, Jr.
(74) *Attorney, Agent, or Firm*—Canon USA, Inc. Intellectual Property Division

(57) ABSTRACT

An apparatus for generating a quantum state of a two-qubit system including two qubits, each qubit being represented by a particle which invariably travels through one of two paths, includes a quantum gate composed of an interferometer for implementing an-interaction-free measurement. The apparatus receives two particles having no correlation and generates a Bell state with asymptotic probability 1. A Bell measurement of a state of a two-qubit system is performed by observing a quantum gate composed of the interferometer after the quantum gate has processed the state and selecting the state from the Bell bases. An approximate fidelity of a quantum gate composed of the interferometer is calculated, if an absorption probability with which a first particle absorbs a second particle in the interferometer is less than 1, under the condition that the number of times the second particle hits beam splitters in the interferometer is sufficiently large.

9 Claims, 8 Drawing Sheets

OTHER PUBLICATIONS

D. Bouwmeester, J.-W. Pan, K. Mattle, M. Eibl, H. Weinfurter, and A. Zeilinger, "Experimental quantum teleportation", Nature (London) 390, 575-579 (1997).

A. Barenco, et al, "Elementary gates for quantum computation", Phys. Rev. A 52, 3457-3467 (1995).

Q.A. Turchette, C.J. Hood, W. Lange, H. Mabuchi, and H.J. Kimble, "Measurement of conditional phase shifts for quantum logic", Phys. Rev. Lett. 75, 4710-4713 (1995).

C. Monroe, D.M. Meekhof, B.E. King, W.M. Itano, and D.J. Wineland, "Demonstration of a fundamental quantum logic gate", Phys. Rev. Lett. 75, 4714-4717 (1995).

E. Knill, R. Laflamme, and G.J. Milburn, "A scheme for efficient quantum computation with linear optics", Nature (London) 409, 46-52 (2001).

T. Yamamoto, et al. Demonstration of conditional gate operation using superconducting charge qubitsNature (London) 425, 941-944 (2003).

J.S. Bell, "Speakable and unspeakable in quantum mechanics" (Oxford, Oxford University Press, 1983).

C.H. Bennett, D.P. DiVincenzo, J.A. Smolin, and W.K. Wootters, "Mixed-state entanglement and quantum error correction", Phys. Rev. A 54, 3824-3851 (1996).

R.F. Werner, "Quantum states with Einstein-Podolsky-Rosen correlations admitting a hidden-variable model", Phys. Rev. A 40, 4277-4281 (1989).

S. Popescu, "Bell's inequalities and density matrices: revealing "hidden" nonlocality", Phys. Rev. Lett. 74, 2619-2622 (1995).

P.G. Kwiat, et al, "New high-intensity source of polarization-entangled . . . ", Phys. Rev. Lett. 75, 4337-4341 (1995).

D. Gottesman and I.L. Chuang, "Demonstrating the viability of universal quantum computation using teleporatation and single-qubit . . . ", Nature (London) 402, 390-393 (1999).

A.C. Elitzur and L. Vaidman, "Quantum mechanical interaction-free measurements", Found. Phys. 23, 987-997 (1993).

L. Vaidman, "Are interaction-free measurements interaction free?", Opt. Spectrosc. 91, 352-357 (2001).

P. Kwiat, H. Weinfurter, T. Herzog, A Zeilinger, and M.A. Kasevich, "Interaction-free measurement", Phys. Rev. Lett. 74, 4763-4766 (1995).

P.G. Kwiat, A.G. White J.R. Mitchell, O.. Nariz, G. Weihs, H. Weinfurter, and A. Zeilinger, "High-efficiency quantum interrogation . . . ", Phys. Rev. Lett 83, 4725-4728 (1999).

* cited by examiner

FIG. 1
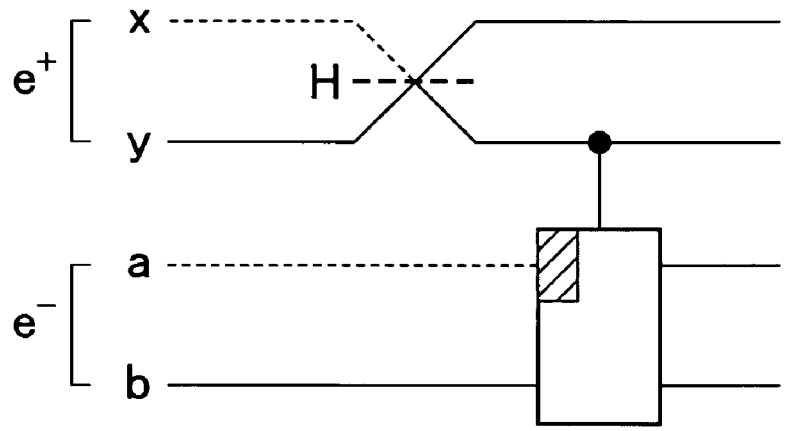
FIG. 2
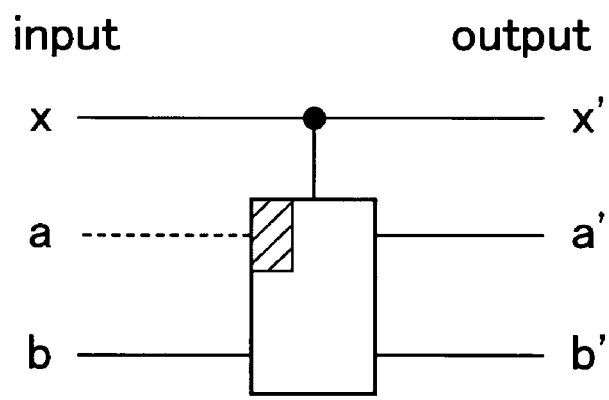
FIG. 3
| input | output |
|---|---|
| $\|0\rangle_x \|0\rangle_a \|1\rangle_b$ | $\|0\rangle_{x'} \|1\rangle_{a'} \|0\rangle_{b'}$ |
| $\|1\rangle_x \|0\rangle_a \|1\rangle_b$ | $\|1\rangle_{x'} \|0\rangle_{a'} \|1\rangle_{b'}$ |

FIG. 7
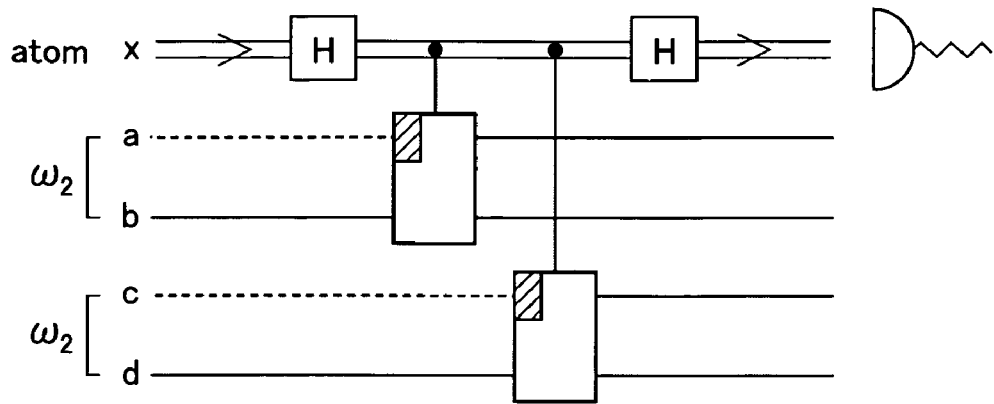
FIG. 8
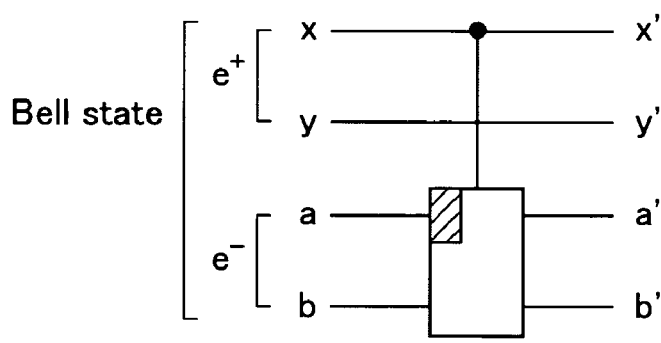
FIG. 9
| input | output |
|---|---|
| $|0\rangle_x |0\rangle_a |1\rangle_b$ | $|0\rangle_{x'} |1\rangle_{a'} |0\rangle_{b'}$ |
| $|1\rangle_x |0\rangle_a |1\rangle_b$ | $|1\rangle_{x'} |0\rangle_{a'} |1\rangle_{b'}$ |
| $|0\rangle_x |1\rangle_a |0\rangle_b$ | $-|0\rangle_{x'} |0\rangle_{a'} |1\rangle_{b'}$ |
| $|1\rangle_x |0\rangle_a |0\rangle_b$ | $|1\rangle_{x'} |0\rangle_{a'} |0\rangle_{b'}$ |
| $|1\rangle_x |1\rangle_a |0\rangle_b$ | $|\gamma\rangle_{x'a'} |0\rangle_{b'}$ |

FIG. 10

| | input | output |
|---|---|---|
| Φ { | $\|0\rangle_x\|1\rangle_y\|0\rangle_a\|1\rangle_b$ | $\|0\rangle_{x'}\|1\rangle_{y'}\|1\rangle_{a'}\|0\rangle_{b'}$ |
| | $\|1\rangle_x\|0\rangle_y\|1\rangle_a\|0\rangle_b$ | $\|\gamma\rangle_{x'a'}\|0\rangle_{y'}\|0\rangle_{b'}$ |
| Ψ { | $\|0\rangle_x\|1\rangle_y\|1\rangle_a\|0\rangle_b$ | $-\|0\rangle_{x'}\|1\rangle_{y'}\|0\rangle_{a'}\|1\rangle_{b'}$ |
| | $\|1\rangle_x\|0\rangle_y\|0\rangle_a\|1\rangle_b$ | $\|1\rangle_{x'}\|0\rangle_{y'}\|0\rangle_{a'}\|1\rangle_{b'}$ |

FIG. 11

| | | Φ⁺ | Φ⁻ | Ψ⁺ | Ψ⁻ |
|---|---|---|---|---|---|
| 1 | I × I | Φ⁺ | Φ⁻ | Ψ⁺ | Ψ⁻ |
| 2 | A | Ψ⁻ | Ψ⁺ | Φ⁻ | Φ⁺ |
| 3 | B | Φ⁺ | Ψ⁺ | Φ⁻ | Ψ⁻ |
| 4 | C | Ψ⁺ | Φ⁻ | Φ⁺ | Ψ⁻ |
| 5 | BA | Ψ⁻ | Φ⁻ | Ψ⁺ | Φ⁺ |
| 6 | CA | Ψ⁻ | Φ⁺ | Φ⁻ | Ψ⁺ |

$A = R_y(\pi) \times I$ $B = R_y(\pi/2) \times R_y(\pi/2)$ $C = R_x(\pi/2) \times R_x(\pi/2)$

FIG. 12

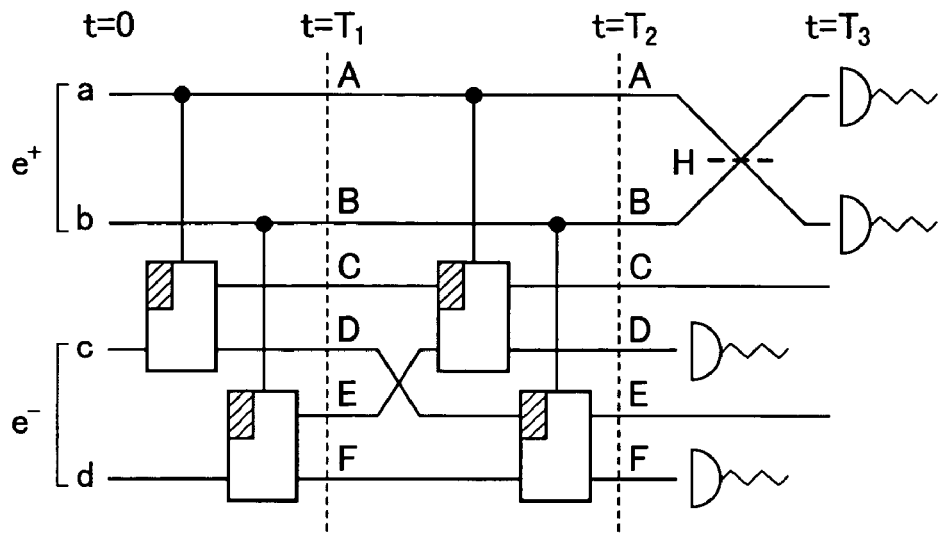

FIG. 13

| t=0 | t=T$_1$ | t=T$_2$ |
|---|---|---|
| $|0\rangle_a|1\rangle_b|0\rangle_c|1\rangle_d$ | $|0\rangle_A|1\rangle_B|0\rangle_C|0\rangle_D|0\rangle_E|1\rangle_F$ | $|0\rangle_A|1\rangle_B|0\rangle_C|0\rangle_E|0\rangle_D|1\rangle_F$ |
| $|0\rangle_a|1\rangle_b|1\rangle_c|0\rangle_d$ | $|0\rangle_A|1\rangle_B|1\rangle_C|0\rangle_D|0\rangle_E|0\rangle_F$ | $-|0\rangle_A|1\rangle_B|0\rangle_C|1\rangle_E|0\rangle_D|0\rangle_F$ |
| $|1\rangle_a|0\rangle_b|0\rangle_c|1\rangle_d$ | $|1\rangle_A|0\rangle_B|0\rangle_C|0\rangle_D|1\rangle_E|0\rangle_F$ | $|1\rangle_A|0\rangle_B|0\rangle_C|1\rangle_E|0\rangle_D|0\rangle_F$ |
| $|1\rangle_a|0\rangle_b|1\rangle_c|0\rangle_d$ | $|1\rangle_A|0\rangle_B|0\rangle_C|1\rangle_D|0\rangle_E|0\rangle_F$ | $-|1\rangle_A|0\rangle_B|0\rangle_C|0\rangle_E|0\rangle_D|1\rangle_F$ |

FIG. 14

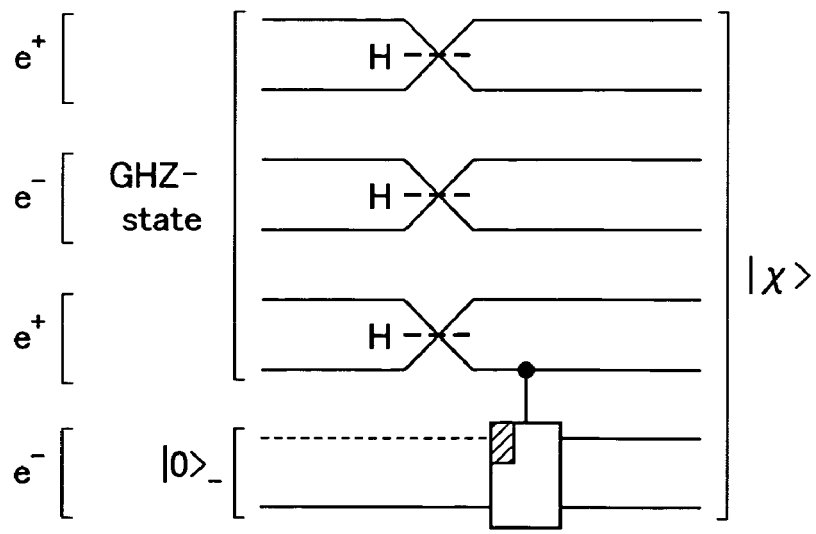

PRIOR ART

QUANTUM-STATE-GENERATING APPARATUS, BELL MEASUREMENT APPARATUS, QUANTUM GATE APPARATUS, AND METHOD FOR EVALUATING FIDELITY OF QUANTUM GATE

BACKGROUND OF THE INVENTION

1. Field of the Invention

The present invention relates to the field of quantum information processing such as quantum computation, quantum communication, and quantum cryptography, and more specifically relates to an apparatus for generating an entangled quantum state of a plurality of qubits (two-state quantum systems), an apparatus for performing Bell measurement, which is simultaneous measurement on a two-qubit system, an apparatus for implementing a controlled-NOT gate, which is unitary transformation of a two-qubit system, and a method for performing approximate evaluation of the fidelity of a quantum gate composed of an interferometer which performs an interaction-free measurement (IFM) (hereafter called an IFM interferometer).

2. Description of the Related Art

Since it was found that quantum computation can solve some kinds of problems more efficiently than classical computers, quantum computation has been extensively researched (see references (1) to (4)). In addition, as research on quantum information processing, such as quantum teleportation, has become popular, the importance of physical phenomenon called quantum entanglement has become more recognized (see references (5) and (6)).

Quantum computation is performed by preparing a plurality of two-state quantum systems called qubits and successively performing unitary transformation of them and observing the results. Any unitary transformation applied to the qubits can be decomposed into U(2) transformations applied to a single qubit and controlled-NOT gates operating on two qubits (see reference (7)). The controlled-NOT gate produces quantum entanglement between two qubits, and various methods have been proposed and experiments have been carried out to realize a controlled-NOT gate. For example, a method using cavity quantum electrodynamics (QED) (see references (8) and (9)), a method for implementing the operation with a certain probability using linear optical devices (see reference (10)), and a method using a superconductive Josephson junction (see reference (11)) have been proposed. However, all of these methods require highly advanced experimental techniques, and are not expected to be put into practical use in the near future. If a controlled-NOT gate were realized, Bell measurement, which is simultaneous measurement on a two-qubit system, could also be realized.

On the other hand, experimental methods for generating an entangled quantum state is also researched. Quantum entanglement is a quantum-mechanical correlation between two systems which can be locally separated from each other. More specifically, in a state called a pure state in quantum mechanics, if the overall state of two systems A and B cannot be expressed in the form of a simple product $|\Psi_{AB}\rangle = |\psi_A\rangle \otimes |\phi_B\rangle$, $|\Psi_{AB}\rangle$ is entangled and the system AB is in a state of quantum entanglement. In this state, neither classical communication between the systems A and B nor a local operation in each of the systems A and B (unitary transformation of each of the systems A and B, addition of an auxiliary system, and observation of a local degree of freedom) is possible. Accordingly, it is considered that the entangled state has a correlation which cannot be explained by classical probability theory (see references (12) to (15)).

In a two-qubit system, typical states of quantum entanglement are Bell states, which are expressed as follows:

$$|\Phi^{\pm}\rangle = (1/\sqrt{2})(|00\rangle \pm |11\rangle)$$

$$|\Psi^{\pm}\rangle = (1/\sqrt{2})(|01\rangle \pm |10\rangle) \quad (1.1)$$

where $\{|0\rangle, |1\rangle\}$ are orthogonal bases of a two-dimensional Hilbert space in which two qubits are defined. In Expression (1.1), $\{|\Phi^{\pm}\rangle, |\Psi^{\pm}\rangle\}$ are orthogonal bases of a four-dimensional Hilbert space spanned by the two qubits, and are therefore called Bell bases. The Bell states play an important role in quantum teleportation.

One known method for generating two particles in a Bell state is parametric down-conversion, in which a nonlinear optical crystal such as beta-barium borate (BBO) and LiIO$_3$ is irradiated with ultraviolet pulses so that pair creation of two photons whose polarization degrees of freedom are in a Bell state occurs (see reference (16)). In this method, however, the occurrence rate of the down-conversion is determined by two-dimensional nonlinear susceptibility $\chi^{(2)}$, and therefore the generation efficiency of Bell photon pairs (Bell pairs) is low. Accordingly, the intensity of the ultraviolet pulses must be increased in actual experiments. Note that the Bell states can be easily generated in a system where the controlled-NOT gate transformation can be freely implemented. Since it is extremely difficult to realize a controlled-NOT gate, only a method for directly generating the Bell state is described here.

The Bell measurement is simultaneous measurement on a 2-qubit system performed for distinguishing four Bell bases $\{|\Phi^{\pm}\rangle, |\Psi^{\pm}\rangle\}$ from one another. In addition to the controlled-NOT gate, the Bell measurement is also a basic operation in quantum information processing, and is essential in quantum teleportation. Gottesman and Chuang have proved that the controlled-NOT gate can be implemented by generating a particular four-qubit state:

$$|\chi\rangle = (1/2)[(|00\rangle + |11\rangle)|00\rangle + (|01\rangle + |10\rangle)|11\rangle] \quad (1.2)$$

and performing the Bell measurement twice and single-qubit unitary transformations depending on the result of the Bell measurement (see reference (17)).

In the following description, an interaction-free measurement (IMF) is adopted as the fundamental concept. The IFM is an observation method formulated by Elitzur and Vaidman and derived to solve the following problem. That is, "when there is an object which always absorbs a photon by a strong interaction if the photon comes near enough to the object, how can it be decided whether this object is present or absent without causing it to absorb the photon?" The reason why the photon is preferably not absorbed by the object is because, for example, there is a risk that the object will explode if it absorbs the photon.

The means by which Elitzur and Vaidman solved this problem will be described below (see also references (18) and (19)). FIG. 20 is a diagram showing an experiment of an interaction-free measurement (IFM) performed by Elitzur and Vaidman. In this experiment, a Mach-Zehnder interferometer including two beam splitters which act as boundaries between an upper path a and a lower path b is used. A state in which a single photon is present on the path a is expressed as $|1\rangle_a$ and a state in which no photon is present on the path a is expressed as $|0\rangle_a$. In addition, an orthogonal relationship $_a\langle i|j\rangle_a = \delta_{ij}$ is satisfied for any i and j (i,j∈{0, 1}).

These settings are similar for the path b. The operations of the two beam splitters B and B' are defined as follows:

$$B: \begin{cases} |1\rangle_a|0\rangle_b \to \cos\theta|1\rangle_a|0\rangle_b - \sin\theta|0\rangle_a|1\rangle_b \\ |0\rangle_a|1\rangle_b \to \sin\theta|1\rangle_a|0\rangle_b + \cos\theta|0\rangle_a|1\rangle_b \end{cases} \quad (1.3)$$

$$B': \begin{cases} |1\rangle_a|0\rangle_b \to \sin\theta|1\rangle_a|0\rangle_b + \cos\theta|0\rangle_a|1\rangle_b \\ |0\rangle_a|1\rangle_b \to \sin\theta|1\rangle_a|0\rangle_b - \sin\theta|0\rangle_a|1\rangle_b \end{cases} \quad (1.4)$$

The upper path a of the interferometer is placed on a point where the presence/absence of the object is to be determined.

The case in which a photon is injected into the path b from the lower left is considered. When nothing is present on the two paths a and b of the interferometer, the photon comes out from the path a at the upper right and is detected by a detector $D_0$. In comparison, when an object which can absorb the photon is present on the upper path a, the object absorbs the photon with probability 1 if the photon comes near enough to cause the interaction. Accordingly, there are three possibilities:

(A) Neither of detectors $D_0$ and $D_1$ detects the photon: probability $P_A = \sin^2\theta$
(B) Detector $D_0$ detects the photon: Probability $P_B = \cos^4\theta$
(C) Detector $D_1$ detects the photon: Probability $P_C = \cos^2\theta \sin^2\theta$ (A) means that the photon has been absorbed by the object, and therefore the condition of IFM is not satisfied. In addition, (B) means that the presence/absence of the object cannot be determined. (C) means that the presence of the object is detected without causing the object to absorb the photon. Elitzur and Vaidman called the operation (C) interaction-free measurement. As used here, the term "interaction-free" describes the case where the photon has not been absorbed by the object.

The efficiency $\zeta$ of the IFM is calculated as follows:

$$\zeta = P_C/(P_A + P_C) \quad (1.5)$$

The reason why $P_B$ is not included in Expression (1.5) is because the experiment can be retried in the case (B). When $\theta = \pi/4$, the beam splitters B and B' serve as 50—50 beam splitters (beam splitters whose transmittance and reflectance are both ½), and $P_A$, $P_B$, $P_C$, and $\zeta$ are determined as $P_A = ½$, $P_B = P_C = ¼$, and $\zeta = ⅓$, respectively. Generally, $\zeta$ is calculated as follows:

$$\zeta = z/(1+z),\ z = \cos^2\theta,\ 0 \le z \le 1 \quad (1.6)$$

FIG. 21 shows a graph of the efficiency $\zeta$ versus the reflectance z ($0 \le z \le 1$) of the beam splitters, and it is clear from this graph that $\zeta \le ½$.

Accordingly, in the method according to Elitzur and Vaidman, the efficiency $\zeta$ never exceeds ½. In addition, $P_B$ approaches 1 as $\zeta$ approaches ½, which means that the number of retries increases. When the object is present on the path a, the average number of tries taken until the measurement finishes by obtaining the result (A) or (C) is calculated as $\overline{N} = 1/(1-P_B) = 1/(1-\cos^4\theta)$. Accordingly, $\overline{N}$ diverges to infinity ($\overline{N} \to \infty$) when $\zeta \to ½$ or $\theta \to 0$. In other words, the number of tries diverges to infinity as $\zeta$ approaches ½.

Kwiat et al. have created a method for causing $\zeta$ to asymptotically approach 1 and $P_B$ to asymptotically approach 0 (see references (20) and (21)). In the method according to Kwiat et al., an interferometer shown in FIG. 22 is used, which includes N beam splitters which act as boundaries between an upper path a and a lower path b. Similar to the above-described case, a state in which a single photon is present on the path a is expressed as $|1\rangle_a$ and a state in which no photon is present on the path a is expressed as $|0\rangle_a$. In addition, these settings are similar for the path b. The operations of the beam splitters B are defined by Expression (1.3).

A photon is injected through the lower left entrance b. When nothing is present on the paths, the wave function of the photon which comes out from the $k^{th}$ beam splitter is expressed as follows:

$$\sin k\theta |1\rangle_a |0\rangle_b + \cos k\theta |0\rangle_a |1\rangle_b,\ k=0, 1, \ldots, N \quad (1.7)$$

When $\theta = \pi/2N$, the photon comes out from the upper right exit a of the $N^{th}$ beam splitter with probability 1.

Next, the case is considered in which N identical objects which can absorb the photon are present on the upper path a at positions behind the beam splitters. In this case, the photon injected through the lower left entrance b cannot pass through the path a since it will be absorbed by the objects if it enters the path a. Accordingly, the probability P that the photon will come out from the lower right exit b is calculated as the product of the reflectances of the beam splitters ($P = \cos^{2N}\theta$). When N increases to infinity, P approaches 1:

$$\lim_{N\to\infty} P = \lim_{N\to\infty} \cos^{2N}\left(\frac{\pi}{2N}\right) = \lim_{N\to\infty}\left[1 - \frac{\pi^2}{4N} + O\left(\frac{1}{N^2}\right)\right] = 1 \quad (1.8)$$

Accordingly, the efficiency $\zeta$ (=P) in detecting the objects by the IFM approaches 1 when $N \to \infty$.

As is clear from the above-discussion, the interferometer according to Kwiat et al. changes the direction in which the photon injected from the lower left travels as follows, at least with probability P:

(1) If no absorbing object is present in the interferometer, the photon comes out from the upper right exit a.
(2) If the absorbing objects are present in the interferometer, the photon will come out from the lower right exit b.

In addition, P approaches 1 as N increases. In the following description, the interferometer shown in FIG. 22 proposed by Kwiat et al. is called an IFM interferometer.

The documents listed below are incorporated herein by reference:

(1) D. Deutsch and R. Jozsa, "Rapid solution of problems by quantum computation", Proc. R. Soc. London, Ser. A 439, 553–558 (1992).
(2) D. R. Simon, "On the power of quantum computation", SIAM J. Comput. 26, 1474–1483 (1997).
(3) P. W. Shor, "Polynomial-time algorithms for prime factorization and discrete logarithms on a quantum computer", SIAM J. Comput. 26, 1484–1509 (1997).
(4) L. K. Grover, "Quantum mechanics helps in searching for a needle in a haystack", Phys. Rev. Lett. 79, 325–328 (1997).
(5) C. H. Bennett, G. Brassard, C. Crepeau, R. Jozsa, A. Peres, and W. K. Wootters, "Teleporting an unknown quantum state via dual classical and Einstein-Podolsky-Rosen channels", Phys. Rev. Lett. 70, 1895–1899 (1993).
(6) D. Bouwmeester, J.-W. Pan, K. Mattle, M. Eibl, H. Weinfurter, and A. Zeilinger, "Experimental quantum teleportation", Nature (London) 390, 575–579 (1997).

(7) A. Barenco, C. H. Bennett, R. Cleve, D. P. DiVincenzo, N. Margolus, P. Shor, T. Sleator, J. A. Smolin, and H. Weinfurter, "Elementary gates for quantum computation", Phys. Rev. A 52, 3457–3467 (1995).

(8) Q. A. Turchette, C. J. Hood, W. Lange, H. Mabuchi, and H. J. Kimble, "Measurement of conditional phase shifts for quantum logic", Phys. Rev. Lett. 75, 4710–4713 (1995).

(9) C. Monroe, D. M. Meekhof, B. E. King, W. M. Itano, and D. J. Wineland, "Demonstration of a fundamental quantum logic gate", Phys. Rev. Lett. 75, 4714–4717 (1995).

(10) E. Knill, R. Laflamme, and G. J. Milburn, "A scheme for efficient quantum computation with linear optics", Nature (London) 409, 46–52 (2001).

(11) T. Yamamoto, Yu. A. Pashkin, 0. Astafiev, Y. Nakamura, and J. S. Tsuai, "Demonstration of conditional gate operation using superconducting charge qubits", Nature (London) 425, 941–944 (2003).

(12) J. S. Bell, "Speakable and unspeakable in quantum mechanics" (Oxford, Oxford University Press, 1983).

(13) C. H. Bennett, D. P. DiVincenzo, J. A. Smolin, and W. K. Wootters, "Mixed-state entanglement and quantum error correction", Phys. Rev. A 54, 3824–3851 (1996).

(14) R. F. Werner, "Quantum states with Einstein-Podolsky-Rosen correlations admitting a hidden-variable model", Phys. Rev. A 40, 4277–4281 (1989).

(15) S. Popescu, "Bell's inequalities and density matrices: revealing "hidden" nonlocality", Phys. Rev. Lett. 74, 2619–2622 (1995).

(16) P. G. Kwiat, K. Mattle, H. Weinfurter, A. Zeilinger, A. V. Sergienko, and Y. Shih, "New high-intensity source of polarization-entangled photon pairs", Phys. Rev. Lett. 75, 4337–4341 (1995).

(17) D. Gottesman and I. L. Chuang, "Demonstrating the viability of universal quantum computation using teleportation and single-qubit operations", Nature (London) 402, 390–393 (1999).

(18) A. C. Elitzur and L. Vaidman, "Quantum mechanical interaction-free measurements", Found. Phys. 23, 987–997 (1993).

(19) L. Vaidman, "Are interaction-free measurements interaction free?", Opt. Spectrosc. 91, 352–357 (2001).

(20) P. Kwiat, H. Weinfurter, T. Herzog, A. Zeilinger, and M. A. Kasevich, "Interaction-free measurement", Phys. Rev. Lett. 74, 4763–4766 (1995).

(21) P. G. Kwiat, A. G. White, J. R. Mitchell, O. Nariz, G. Weihs, H. Weinfurter, and A. Zeilinger, "High-efficiency quantum interrogation measurements via the quantum Zeno effect", Phys. Rev. Lett. 83, 4725–4728 (1999).

In the field of quantum information processing such as quantum computing, quantum communication, and quantum cryptography, the three most important basic operations are: generation of the Bell state, the Bell measurement, and the controlled-NOT gate transformation. These three operations are not independent from one another but are closely related to one another, and there are demands for these operations.

As described above, one known method for generating two particles in a Bell state is parametric down-conversion, in which a nonlinear optical crystal is irradiated with ultraviolet pulses so that pair creation of two photons whose polarization degrees of freedom are in a Bell state occurs. In this method, however, the occurrence rate of the down-conversion is determined by the two-dimensional nonlinear susceptibility $\chi^{(2)}$, and therefore the generation efficiency of Bell photon pairs is low. Accordingly, the intensity of the ultraviolet pulses must be increased in actual experiments.

The Bell measurement is an essential technique in quantum teleportation, and it is an important objective in quantum information processing to create a simple method for the Bell measurement.

The controlled-NOT gate is regarded as an essential technique to realize a quantum computer. More specifically, a U(2) transformation gate for a single qubit and a controlled-NOT gate form a universal set of gates for quantum computation, and it is known that any kind of operation on qubits can be implemented by combining these gates. Accordingly, to realize a controlled-NOT gate is one of the most important objectives in quantum information processing. If a controlled-NOT gate were realized, generation of the Bell state and the Bell measurement could also be realized.

However, it is difficult to realize a controlled-NOT gate which produces a quantum correlation between two qubits. Although a method using cavity QED and other methods have been proposed, as described above, these methods require highly advanced experimental techniques, and are not expected to be put into practical use in the near future.

On the other hand, Gottesman and Chuang have proved that a controlled-NOT gate can be implemented by generating a particular four-qubit state $|\chi\rangle$ and performing the Bell measurement twice and single-qubit unitary transformations depending on the result of the Bell measurement. This means that although it is difficult to implement the controlled-NOT gate directly, it can be implemented indirectly if the Bell measurement can be performed easily.

Thus, the Bell measurement and the controlled-NOT gate are closely related to each other, and there is a requirement to create a simple method for the Bell measurement and to thereby realize a controlled-NOT gate.

SUMMARY OF THE INVENTION

Accordingly, an object of the present invention is to easily generate a Bell state using an interaction-free measurement (IFM), to perform the Bell measurement, which is simultaneous measurement on a two-particle system, and to implement a controlled-NOT gate, which is unitary transformation of a two-particle system.

In addition, another object of the present invention is to provide an approximate evaluation method for the fidelity of a logic gate using the interaction-free measurement (IFM).

According to one aspect of the present invention, an apparatus for generating a quantum state of a two-qubit system including two qubits, each qubit being represented by a particle which invariably travels through one of two paths, includes an input unit for receiving two particles having no correlation with each other; and a quantum gate composed of an interferometer for implementing an interaction-free measurement, the quantum gate generating a Bell state with asymptotic probability 1.

According to another aspect of the present invention, a Bell measurement apparatus for a two-qubit system including two qubits, each qubit being represented by a particle which invariably travels through one of two paths, includes an input unit for receiving the state of the two-qubit system; at least one quantum gate composed of an interferometer for implementing an interaction-free measurement; an observation unit for observing the quantum gate after the state of the two-qubit system has been processed by the quantum gate; and an identifying unit which performs a Bell measurement for selecting the state of the two-qubit system from among the Bell bases on the basis of the result of the observation.

According to still another aspect of the present invention, a method for evaluating the fidelity of a quantum gate composed of an interferometer for implementing an interaction-free measurement, includes the steps of determining an absorption probability with which a first particle absorbs a second particle in the interferometer; calculating, if the absorption probability is less than 1, an approximate fidelity of the quantum gate under the condition that the number of times the second particle hits beam splitters in the interferometer is sufficiently large.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a diagram showing a quantum circuit for generating a Bell state.

FIG. 2 is a diagram showing an IFM gate proposed by Kwiat et al.

FIG. 3 is table showing a state transformation performed by the IFM gate.

FIG. 7 is a diagram showing a quantum circuit for generating and outputting the Bell state from two photons having no correlation.

FIG. 8 is a diagram showing a quantum circuit for performing a Bell measurement using the IFM gate.

FIG. 9 is a table showing a state transformation performed by an expanded IFM gate which allows dissipation in a system.

FIG. 10 is a table showing a state transformation performed when a two-qubit state is input to the quantum circuit shown in FIG. 8.

FIG. 11 is a table showing a random permutation of Bell-basis vectors.

FIG. 12 is a diagram showing a quantum circuit for performing the Bell measurement using IFM gates.

FIG. 13 is a table showing the results of a state transformation obtained at $t=T_1$ and $t=T_2$ in FIG. 12.

FIG. 14 is a diagram showing a quantum circuit which provides a particular four-qubit entangled state.

DESCRIPTION OF THE PREFERRED EMBODIMENTS

Figure 4:
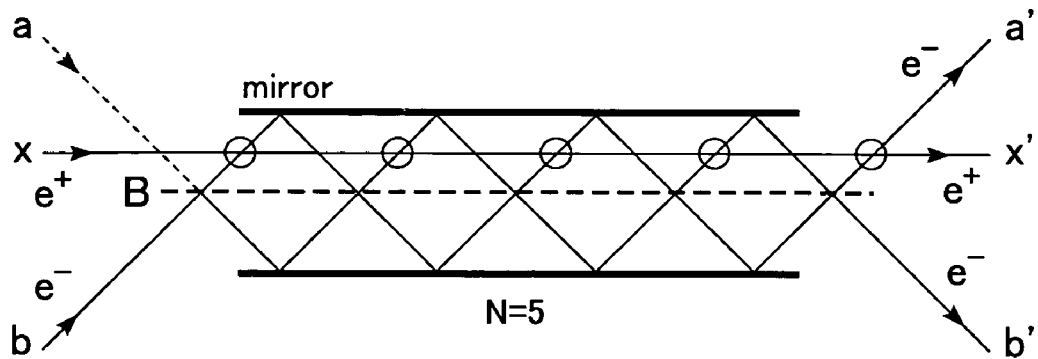
FIG. 4 is a diagram showing an interferometer according to Kwiat et al., which uses a positron-electron pair.

Embodiments of the present invention will be described below with reference to the accompanying drawings.

A Bell-state-generating apparatus, a Bell measurement apparatus, and a controlled-NOT gate transformation apparatus include a quantum gate composed of an interferometer according to Kwiat et al., and the quantum gate operates with probability 1 when N→∞, where N is the number of beam splitters included in the interferometer according to Kwiat et al.

Apparatuses described below implement a logic gate using an interaction-free measurement to realize the generation of a Bell state, a Bell measurement, which is simultaneous measurement on a two-particle system, and a controlled-NOT gate, which is unitary transformation of a two-particle system.

In addition, according to a method for evaluating the fidelity of the quantum gate described below, an approximate evaluation of the fidelity of the quantum gate composed of the interferometer according to Kwiat et al. is performed under the condition that a particle absorption probability is fixed and the number of times the second particle hits beam splitters in the interferometer is sufficiently large.

First Embodiment

In a first embodiment, a Bell-state-generating apparatus will be described.

In the above-described interferometer according to Kwiat et al., the moving direction of the particle B (photon) is changed depending on the presence/absence of the particle A (absorbing object). This can be interpreted as writing information of the particle A to the particle B. Accordingly, in the present embodiment, the interferometer according to Kwiat et al. is regarded as a quantum gate between the two particles. In addition, in the interferometer according to Kwiat et al., the absorbing object is regarded as a classical particle which is either present or absent in the interferometer. In comparison, in the present embodiment, the absorbing object is regarded as a quantum particle which can be in a superposition of present and absent states in the interferometer.

In addition, in the present embodiment, the particle A is input to the quantum gate while it is in a quantum superposition of the present and absent states in a chamber of a cavity, so that the Bell state of the two particles A and B is output.

In the following description, a Bell-state-generating apparatus using an electron-positron pair will be explained.

The interaction-free measurement (IFM) is an experiment using an interferometer which includes a cavity and beam splitters sectioning the cavity into two chambers. Two particles consisting of a particle B and a particle A which absorbs the particle B if the particles A and B come near enough to each other are input to different chambers, and the particle B is caused to successively hit the beam splitters, so that the transmitted wave component of the wave function of the particle B travels back and forth between the two chambers. The particle transmittance of the beam splitters is set low so that the probability amplitude of the state in which the particle B is absorbed by the particle A by entering the same chamber with the particle A when the particle B particle hits one of the beam splitters is set small. As the number of times the particle B hits the beam splitters increases and the transmittance of the beam splitters reduces, the probability that the particle A will absorb the particle B approaches zero. Accordingly, the particle B is put into different chambers depending on whether or not the particle A is input to the cavity. As described above, in the IFM interferometer, one of two particles travels through different paths depending on the presence/absence of the other particle, and thus the IFM interferometer functions as a quantum gate.

Figure 22:
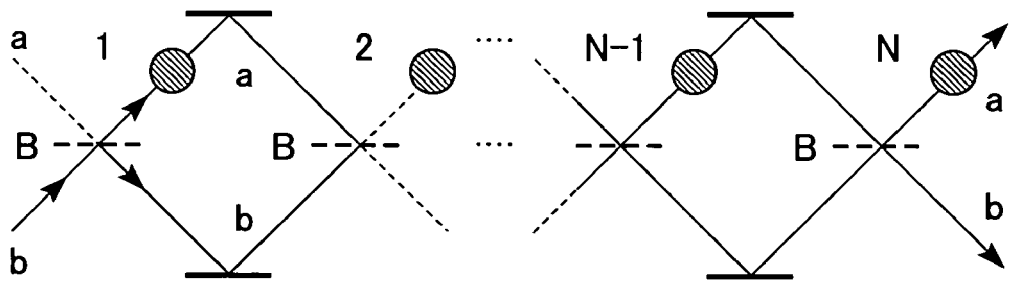
FIG. 22 is a diagram showing an interferometer according to Kwiat et al.

In the interferometer according to Kwiat et al. shown in FIG. 22, the photon comes out from the interferometer through different paths a and b depending on the presence/absence of the absorbing objects with asymptotic probability 1 when N→∞ (N is the number of beam splitters). This can be interpreted as writing information of the absorbing objects to the photon. In addition, in the IFM according to Kwiat et al., dissipation (annihilation) of the photon does not occur when N→∞, and therefore no state contraction occurs. Accordingly, the quantum state will not be destroyed in the process of IFM, which means that the object can be regarded not only as a classical object but also as a quantum object. More specifically, in the above-described known technique, each of the absorbing objects is regarded as a classical object which is either present or absent in the interferometer. However, in the present embodiment, an absorbing object can be in a superposition of two orthogonal states, that is, the present and absent states, is considered, and this object is input to the interferometer. This means that the absorbing object is regarded as a quantum object. The substitution of a classical absorbing object with a quantum object in the IFM according to Elitzur and Vaidman has been discussed by Hardy (L. Hardy, "Quantum mechanics, local realistic theories, and Lorentz-invariant realistic theories", Phys. Rev. Lett. 68, 2981–2984 (1992).)

From the above discussion, it is expected that the IFM interferometer according to Kwiat et al. will function as a quantum gate. Accordingly, the interferometer shown in FIG. 22 is represented by the symbol shown in FIG. 2. The entrances a and b at the upper left and the lower left in FIG. 22 correspond to entrances a and b, respectively, in FIG. 2, and the exits a and b at the upper right and the lower right in FIG. 22 correspond to exits a' and b', respectively, in FIG. 2. In FIG. 2, an absorbing object is input from x and is output from x'. As described above in the section of the related art, no photon is input from the entrance a in FIG. 2 in the IFM, and therefore the path extending from the entrance a is shown by a dashed line and a filled rectangle is shown adjacent to the entrance a in the symbol representing the gate. The symbol shown in FIG. 2 is hereafter called an IFM gate. In addition, a section including the paths x and x' and a section including the paths a, b, a', and b' are sometimes called a control section and a target section, respectively.

A state transformation obtained by the IFM gate shown in FIG. 2 when N→∞ is shown in FIG. 3. In the table of FIG. 3, the first line corresponds to the case in which no absorbing object is provided and a photon is input to the path b, and the second line corresponds to the case in which an absorbing object is input to the path x and a photon is input to the path b. In the following description, it is assumed that N is increased to infinity (N→∞) in the IFM gate and the IFM gate performs the transformation shown in FIG. 3. The IFM gate also performs the linear transformation shown in FIG. 3 when an object in a superposition of $|0>_x$ and $|1>_x$ is input to the path x.

For convenience, an electron and a positron are considered in place of the photon and the absorbing object, respectively, in the following discussion (the electron and the positron are hereafter sometimes expressed as $e^-$ and $e^+$, respectively). When the electron and the positron come near enough to each other, a photon is generated by pair annihilation. Here, it is assumed that this reaction occurs with probability 1. This reaction can be interpreted as the absorption of the electron by the positron. In addition, when a suitable potential barrier is used, beam splitters and mirrors for the electron and the positron can be obtained. Accordingly, it is possible to form an interferometer similar to that shown in FIG. 22 for the electron and the positron.

It is to be noted that, in order to form an IFM gate for the electron and the positron, the speeds of the electron and the positron and the paths along which they travel must be adjusted such that the two particles approach each other at positions corresponding to the positions where the absorbing objects are placed in the cavity in FIG. 22. The electron and the positron considered here are quantum objects, and each of them must be regarded as a wave packet having fluctuations (expansions) $\vec{\Delta x}$ and $\vec{\Delta p}$ ($|\vec{\Delta x}||\vec{\Delta p}|$~$\hbar/2$ is satisfied by the uncertainty principle). In order for the pair annihilation of the electron and the positron to occur, the distance between the two particles must be $\Delta r$ or less at time t ($\Delta r$ is a particular range of Coulomb interaction). In the reaction considered here, $|\vec{\Delta x}|<<\Delta r$ is assumed. Accordingly, it is not necessary to take into account the quantum mechanical expansion of the wave packet when the two particles approach each other, and therefore the electron and the positron can be regarded as point particles.

The actual construction of the interferometer is shown in FIG. 4. FIG. 4 shows an interferometer according to Kwiat et al. to which a positron and an electron generated by an accelerator are input. The interferometer includes a vacuum vessel containing mirrors and beam splitters composed of metal plates providing a suitable potential barrier. In FIG. 4, paths x, a, and b at the left and paths x', a', and b' at the right respectively correspond to the paths x, a, b, x', a', and b' shown in FIG. 2. The interferometer shown in FIG. 4 includes five beam splitters, and the circles show the positions where the positron-electron pair annihilation occurs. The speeds of the positron and the electron must be adjusted such that they approach each other at the positions shown by the circles.

FIG. 1 shows an apparatus which generates and outputs a Bell state when a positron and an electron having no correlation with each other are input. The apparatus shown in FIG. 1 is sometimes called a quantum circuit since it is a combination of gates which operate quantum-theoretically. The operation of a beam splitter H shown in FIG. 1 is defined as follows:

$$H : \begin{cases} |0\rangle_x |1\rangle_y \to (1/\sqrt{2})(|0\rangle_x |1\rangle_y + |1\rangle_x |0\rangle_y) \\ |1\rangle_x |0\rangle_y \to (1/\sqrt{2})(|0\rangle_x |1\rangle_y - |1\rangle_x |0\rangle_y) \end{cases} \quad (2.1)$$

This transformation is called a Hadamard transformation. When a positron is input to the beam splitter H from the path y, it is output from the two paths in a superposition with an amplitude of $1/\sqrt{2}$. The IFM gate operates as described above with reference to FIGS. 22, 2, and 3.

The operation of the quantum circuit shown in FIG. 1 will be described below. Initially, a positron is input to the path y and an electron is input to the path b. The state in which a single photon is present in the path x is expressed as $|1\rangle_x$ and state in which no photon is present in the path x is expressed as $|0\rangle_x$. In addition, it is assumed that an orthogonal relationship $_x\langle i|j\rangle_x = \delta_{ij}$ is satisfied for any i and j (i,j∈{0, 1}). These settings are similar for the paths y, a, and b. In FIG. 1, the state changes from the left to the right as follows:

$$|0\rangle_x |1\rangle_y |0\rangle_a |1\rangle_b \quad (2.2)$$

$$H: \to (1/\sqrt{2})(|0\rangle_x |1\rangle_y + |1\rangle_x |0\rangle_y)|0\rangle_a |1\rangle_b$$

$$\text{IFM gate:} \to (1/\sqrt{2})(|0\rangle_x |1\rangle_y |0\rangle_a |1\rangle_b + |1\rangle_x |0\rangle_y |1\rangle_a |0\rangle_b)$$

Logical ket vectors of the positron and the electron are defined as follows:

$$|\bar{0}\rangle_+ = |0\rangle_x |1\rangle_y, \quad |\bar{1}\rangle_+ = |1\rangle_x |0\rangle_y \quad (2.3)$$

$$|\bar{0}\rangle_- = |0\rangle_a |1\rangle_b, \quad |\bar{1}\rangle_- = |1\rangle_a |0\rangle_b \quad (2.4)$$

where an orthogonal relationship $_\alpha\langle \bar{i}|\bar{j}\rangle_\beta = \Delta_{\alpha\beta}\Delta_{ij}$ is satisfied for any α and β (α, β∈{+,−}) and for any i and j (i, j∈{0,1}). Accordingly, the transformation of Expression (2.2) can be rewritten as follows:

$$|\bar{0}\rangle_+ |\bar{0}\rangle_- \to |\Phi^+\rangle = (1/\sqrt{2})(|\bar{0}\rangle_+ |\bar{0}\rangle_- + |\bar{1}\rangle_+ |\bar{1}\rangle_-) \quad (2.5)$$

This means that the Bell state is generated from two particles having no correlation.

Figure 20:
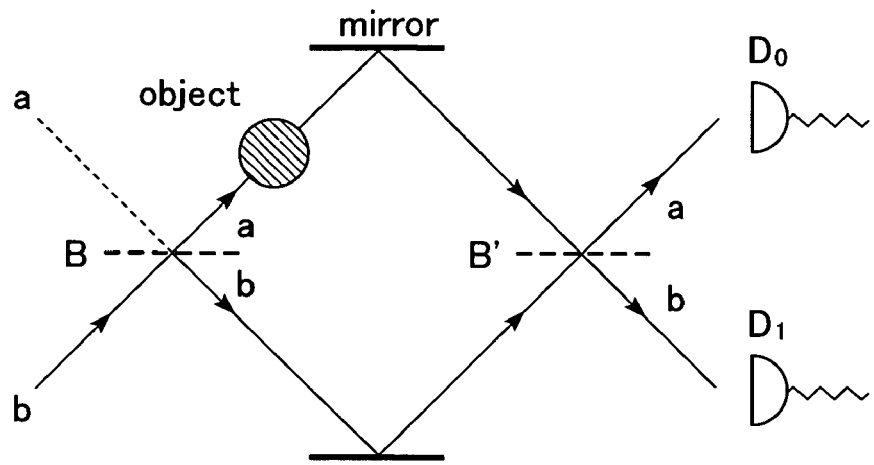
FIG. 20 is a diagram showing the experiment of an interaction-free measurement.
Figure 21:
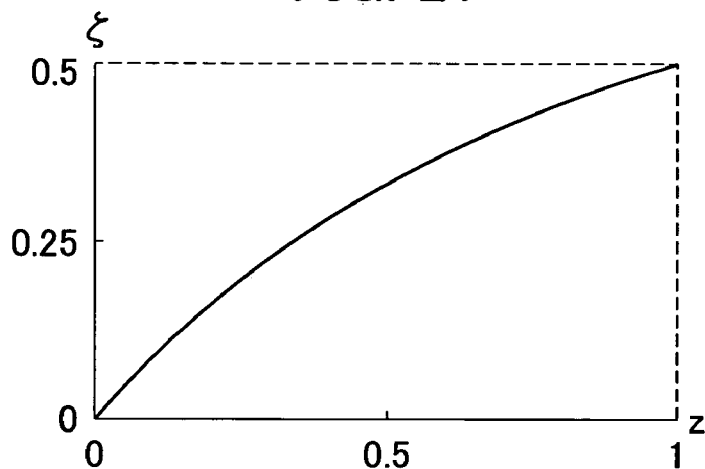
FIG. 21 is a graph of the efficiency ζ of the interaction-free measurement plotted as a function of the reflectance z of beam splitters.

The method for obtaining the logical ket vectors $\{|\bar{0}\rangle, |\bar{1}\rangle\}$ of a qubit using two paths as in Expressions (2.3) and (2.4) is called a dual-rail representation (I. L. Chuang and Y. Yamamoto, "Simple quantum computer", Phys. Rev. A 52, 3489–3496 (1995).) In this qubit-representing method, it is ensured that a particle is always present in one of the two paths. In addition, by placing two beam splitters B and B' between the two paths as shown in FIG. 20, a desired unitary transformation can be implemented on a two-dimensional Hilbert space spanned by $\{|\bar{0}\rangle, |\bar{1}\rangle\}$. Although $|\Phi^+\rangle$ is generated in Expressions (2.2) and (2.5), $|\Phi^-\rangle$ and $|\Psi^\pm\rangle$ can also be obtained by adding a beam splitter between two paths forming a qubit.

In the quantum circuit shown in FIG. 1, the number of electrons and positrons is maintained between the initial and final states, and no pair annihilation occurs. In this view, the generation of the Bell state according to Expressions (2.2) and (2.5) can be regarded as an interaction-free process. In addition, since the probability P that the IFM gate will operate correctly approaches 1 when N→∞, the fidelity $F = |\langle \Phi^+|\phi\rangle|^2$ of the state $|\phi\rangle$ generated by Expressions (2.2) and (2.5) also approaches 1 when N→∞.

Figure 5:
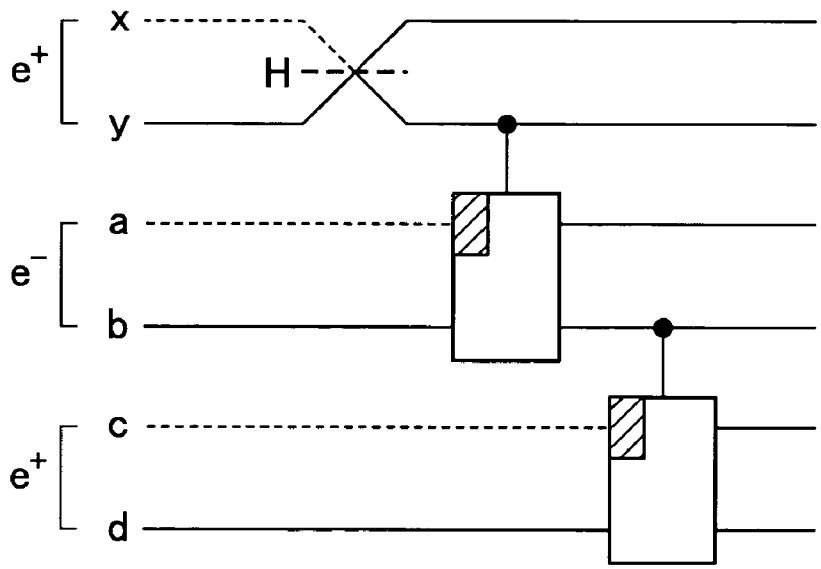
FIG. 5 is a diagram showing a quantum circuit for generating and outputting a GHZ state.

A GHZ state $(1/\sqrt{2})(|000\rangle + |111\rangle)$ can also be generated by a similar method. FIG. 5 shows a quantum circuit which generates and outputs a GHZ state when two positrons and an electron having no correlation with one another are input. The quantum circuit performs the following transformation:

$$|\bar{0}\rangle_+ |\bar{0}\rangle_- |\bar{0}\rangle_+ \to (1/\sqrt{2})(|\bar{0}\rangle_+ |\bar{0}\rangle_- |\bar{0}\rangle_+ + |\bar{1}\rangle_+ |\bar{1}\rangle_- |\bar{1}\rangle_+) \quad (2.6)$$

In the present embodiment, the case in which a positron and an electron are used as two particles is described. However, any kinds of particles may be used as long as one of them absorbs the other when they approach each other.

Second Embodiment

In a second embodiment, an apparatus for generating the Bell state using a pair of photons will be described.

Figure 6:
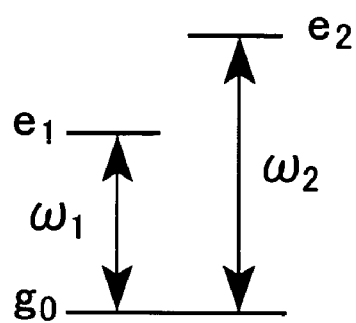
FIG. 6 is an energy level diagram of an auxiliary atom used for generating of a two-photon Bell state.

Generation of the Bell state using photons instead of the electron-positron pair, which causes pair annihilation, as qubits will be described below. In this case, an atom is required as an object which absorbs the photons. In the present embodiment, an experiment is considered in which only a Rabi oscillation and beam splitters for the photons are used as elements. The reason that these two elements are used is because they are frequently used in cavity-QED experiments. FIG. 6 is an energy level diagram of an auxiliary atom used for generating a two-photon Bell state by the IFM. The atom has three levels: a ground state $g_0$, a first excited state $e_1$, and a second excited state $e_2$, and an energy difference between $e_1$ and $g_0$ and that between $e_2$ and $g_0$ are $\hbar\omega_1$ and $\hbar\omega_2$, respectively. It is assumed that $\omega_2 > \omega_1$ is satisfied, $\hbar\omega_1$, $\hbar\omega_2$, and $\hbar(\omega_2 - \omega_1)$ are sufficiently large, and $\tau_1 \gg \tau_2$ is satisfied, where $\tau_1$ is the spontaneous emission lifetime of $e_1 \to g_0 + \hbar\omega_1$ and $\tau_2$ is the time required to excite the atom from $g_0$ to $e_2$ by causing it to absorb a photon with an angular frequency $\omega_2$.

When an electric field with an angular frequency slightly shifted from $\omega_1$ (laser pulse $\omega = \omega_1 - \Delta\omega$, $0 < |\Delta\omega| \ll \omega_1$) is applied to the atom, Rabi oscillation between the ground state $g_0$ and the first excited state $e_1$ occurs (R. Loudon, "The Quantum Theory of Light", second edition, (Oxford, Oxford University Press, 1983)). When a photon with an angular frequency $\omega_2$ is regarded as a qubit, the atom can absorb the photon if the atom is in the state $g_0$ but cannot absorb the photon if the atom is in the state $e_1$, and this can be used for performing the IFM. Here, it is assumed that the photon with the angular frequency $\omega_2$ is absorbed by the atom with probability 1 if the photon is incident on the atom while the atom is in the state $g_0$.

FIG. 7 shows a quantum circuit which uses a three-level atom as an auxiliary system to generate and output the Bell state from two photons having no correlation. The atom is input to a path x while it is in the state $|e_1\rangle$, and photons with the angular frequency $\omega_2$ are input to paths b and d. The state of the atom in the path x is expressed as follows:

$$|e_1\rangle = |0\rangle_x, \quad |g_0\rangle = |1\rangle_x \quad (3.1)$$

The atom traveling through the path x is irradiated with a combination of suitable laser pulses so that the Rabi oscillation occurs, and the Hadamard transformation H is thereby implemented as follows:

$$H: |0\rangle_x \to (1/\sqrt{2})(|0\rangle_x + |1\rangle_x), |1\rangle_x \to (1/\sqrt{2})(|0\rangle_x - |1\rangle_x) \quad (3.2)$$

The IFM gates perform the transformation defined by the table of FIG. 3.

In FIG. 7, the state of the overall system changes from the left to the right as follows:

$$|0\rangle_x |0\rangle_a |1\rangle_b |0\rangle_c |1\rangle_d$$

$$H: \to (1/\sqrt{2})(|0\rangle_x + |1\rangle_x)|0\rangle_a |1\rangle_b |0\rangle_c |1\rangle_d$$

First IFM gate:

$$\to (1/\sqrt{2})(|0\rangle_x |1\rangle_a |0\rangle_b + |1\rangle_x |0\rangle_a |1\rangle_x |0\rangle_a |1\rangle_b |)\ |0\rangle_c |1\rangle_d$$

Second IFM gate:

$$\to (1/\sqrt{2})(|0\rangle_x |1\rangle_a |0\rangle_b |1\rangle_c |0\rangle_d + |1\rangle_x |0\rangle_a |1\rangle_b |0\rangle_c |1\rangle_d) \quad (3.3)$$

$$= (1/\sqrt{2})(|0\rangle_x |\bar{1}\rangle_\omega |\bar{1}\rangle_\omega + |1\rangle_x |\bar{0}\rangle_\omega |\bar{0}\rangle_\omega)$$

$$H: \to (1/2)[(|0\rangle_x + |1\rangle_x)|\bar{1}\rangle_\omega |\bar{1}\rangle_\omega + (|0\rangle_x - |1\rangle_x)|\bar{0}\rangle_\omega |\bar{0}\rangle_\omega]]$$

$$= (1/2)[|0\rangle_x (|\bar{0}\rangle_\omega |\bar{0}\rangle_\omega + |\bar{1}\rangle_\omega |\bar{1}\rangle_\omega) - |1\rangle_x (|\bar{0}\rangle_\omega |\bar{0}\rangle_\omega - |\bar{1}\rangle_\omega |\bar{1}\rangle_\omega)]$$

Then, the atom is observed in the basis $\{|0\rangle_x, |1\rangle_x\} = \{|e_1\rangle, |g_0\rangle\}$. If $|0\rangle_x = |e_1\rangle$ is observed, the two photons are projected into $|\Phi^+\rangle = (1/\sqrt{2}) (|\bar{0}\rangle_\omega |\bar{0}\rangle_\omega + |\bar{1}\rangle_\omega |\bar{1}\rangle_\omega)$. If $|1\rangle_x = |g_0\rangle$ is observed, the two photons are projected into $|\Phi^-\rangle = (1/\sqrt{2}) (|\bar{0}\rangle_\omega |\bar{0}\rangle_\omega - |\bar{1}\rangle_\omega |\bar{1}\rangle_\omega)$. Accordingly, the Bell state of two photons is generated.

Some methods for producing quantum correlation (entanglement) between two photons using the technique of cavity-QED have been proposed (Q. A. Turchette, C. J. Hood, W. Lange, H. Mabuchi, and H. J. Kimble, "Measurement of conditional phase shifts for quantum logic", Phys. Rev. Lett. 75, 4710–4713 (1995); C. Monroe, D. M. Meekhof, B. E. King, W. M. Itano, and D. J. Weinland, "Demonstration of a fundamental quantum logic gate", Phys. Rev. Lett. 75, 4714–4717 (1995)). However, the principles of these methods are different from that of the method according to the present embodiment.

Third Embodiment

In a third embodiment, a first example of an apparatus for performing the Bell measurement will be described.

In a Bell measurement apparatus according to the present embodiment, a state to be observed is input to a quantum circuit obtained by combining the above-described quantum gate and beam splitters, and an adequate observation is performed after the state has been processed by the circuit. Then, the Bell basis of the observed state is selected from among the four Bell bases depending on the result of the observation.

A method for distinguishing two-qubit states $\{|\Phi^\pm\rangle, |\Psi^\pm\rangle\}$ of a system consisting of a positron and an electron from one another using the IFM gate will be described below (the Bell states obtained by a three-level atom and photons can also be distinguished from one another by a similar method). FIG. 8 shows a quantum circuit for implementing a Bell measurement using the IFM gate. One of the states $\{|\Phi^\pm\rangle, |\Psi^\pm\rangle\}$ is input to this quantum circuit. Although no particle is input to the path a of the IFM gate in the above-described embodiments, the case in which an electron is input to the path a is also considered in the present embodiment (the input is expanded compared to FIG. 3). The thus expanded IFM gate which allows dissipation in the system performs a transformation shown in FIG. 9 (it is assumed that the number N of beam splitters included in the IFM interferometer is increased to infinity ($N \to \infty$)). Note that the wave function is multiplied by a phase factor ($-1$) if an electron is input to the path a while no positron is input to the path x. In addition, if a positron is input to the path x and an electron is input to the path a, pair annihilation of the electron and the positron occurs and a photon $\gamma$ is generated ($e^+ e^- \to \gamma$). The symbol $|\gamma\rangle_{xa}$ in the fifth row of the table of FIG. 9 represents this process. When an atom and photons are input instead of the electron and the positron, as in the second embodiment, $|\gamma\rangle_{xa}$ in the fifth row means that the atom is in the second excited state $e_2$. In either case, it means that dissipation has occurred in the system and the system cannot function as a quantum gate. In this view, the IFM gate is not unitary. In the following description, it is assumed that N is increased to infinity ($N \to \infty$) in the IFM gate and the IFM gate performs the transformation shown in FIG. 9.

When the two-qubit states $\{|\bar{0}\rangle_+ |\bar{0}\rangle_-, |\bar{0}\rangle_+ |\bar{1}\rangle_-, |\bar{1}\rangle_+ |\bar{0}\rangle_-, |\bar{1}\rangle_+ |\bar{1}\rangle_-\}$ are input to the quantum circuit shown in FIG. 8, a state transformation shown in FIG. 10 is performed. Note that $|022\rangle_+ = |0\rangle_x |1\rangle_y$, $|\bar{1}\rangle_+ = |1\rangle_x |0\rangle_y$, $|\bar{0}\rangle_- = |0\rangle_a |1\rangle_b$, and $|\bar{1}\rangle_- = |1\rangle_a |0\rangle_b$ are defined as in Expressions (2.3) and (2.4), and the state transformation shown in FIG. 10 is arranged in the order of $|\bar{0}\rangle_+ |\bar{0}\rangle_-, |\bar{1}\rangle_+ |\bar{1}\rangle_-, |\bar{0}\rangle_+ |\bar{1}\rangle_-,$ and $|\bar{1}\rangle_+ |\bar{0}\rangle_-$ from the top. Since one of the states $\{|\Phi^\pm\rangle, |\Psi^\pm\rangle\}$ is input, when the path b' is observed in the basis $\{|0\rangle_{b'}, |1\rangle_{b'}\}$, $|0\rangle_{b'}$ is obtained for $|\Phi^\pm\rangle$ and $|1\rangle_{b'}$ is obtained for $|\Psi^\pm\rangle$. Thus, $|\Phi^\pm\rangle$ and $|\Psi^\pm\rangle$ can be distinguished from each other by observing the path b'.

The case is considered in which one of $|\Psi^+\rangle$ and $|\Psi^-\rangle$ is input. When the particles are input to the quantum circuit shown in FIG. 8 and $|1\rangle_{b'}$ is obtained as a result of observation of the path b', the state changes as follows:

$$|\Psi^\pm\rangle = (1/\sqrt{2})(|\bar{0}\rangle_+ |\bar{1}\rangle_- \pm |\bar{1}\rangle_+ |\bar{0}\rangle_-)$$

$$= (1/\sqrt{2})(|0\rangle_x |1\rangle_y |1\rangle_a |0\rangle_b \pm |1\rangle_x |0\rangle_y |0\rangle_a |1\rangle_b)$$

IFM gate: $\to (1/\sqrt{2}) (-|0\rangle_x |1\rangle_{y'} \pm |1\rangle_x |0\rangle_{y'}) |0\rangle_a |1\rangle_{b'}$ Observation at Path b':

$$\to (1/\sqrt{2})(-|0\rangle_{x'} |1\rangle_{y'} \pm |1\rangle_{x'} |0\rangle_{y'}) |0\rangle_{a'} = \quad (4.1)$$

$$(1/\sqrt{2})(-|\bar{0}\rangle_+ \pm |\bar{1}\rangle_+) |0\rangle_{a'}$$

Then, the positron in the paths x and y is input to the beam splitter H defined by Expression (2.1). The operation of the beam splitter H can be rewritten using the basis $\{|\bar{0}\rangle, |\bar{1}\rangle\}$ as follows:

$$H: |\bar{0}\rangle \to (1/\sqrt{2})(|\bar{0}\rangle + |\bar{1}\rangle), |\bar{1}\rangle \to (1/\sqrt{2})(|\bar{0}\rangle - |\bar{1}\rangle) \quad (4.2)$$

Accordingly, $|\Psi^+\rangle$ or $|\Psi^-\rangle$ which is input to the quantum circuit is eventually converted as follows:

$$|\Psi^+\rangle \to -|\bar{1}\rangle_+|0\rangle_{a'}, |\Psi^-\rangle \to -|\bar{0}\rangle_+|0\rangle_{a'} \quad (4.3)$$

Thus, $|\Psi^+\rangle$ and $|\Psi^-\rangle$ can be distinguished from each other by observing the paths x and y in the basis $\{|\bar{0}\rangle_+, |\bar{1}\rangle_+\}$.

When one of $|\Phi^+\rangle$ and $|\Phi^-\rangle$ is input to the quantum circuit, dissipation occurs in the system due to the pair annihilation of the positron-electron pair, and further quantum operation is impossible. Therefore, if $|0\rangle_{b'}$ is observed at the path b', $|\Phi^+\rangle$ or $|\Phi^-\rangle$ is randomly determined by a classical coin-toss method or the like.

As a result, $|\Psi^+\rangle$ and $|\Psi^-\rangle$ can be distinguished from each other with probability 1, and $|\Phi^+\rangle$ and $|\Phi^-\rangle$ can be distinguished from each other with probability ½. In quantum teleportation, it is necessary to distinguish the four basis vectors $\{|\Phi^\pm\rangle, |\Psi^\pm\rangle\}$ in the following state:

$$|\psi\rangle \otimes |\Phi^+\rangle = \quad (4.4)$$
$$(1/2)[|\Phi^+\rangle \otimes |\psi\rangle + |\Phi^-\rangle \otimes \sigma_z|\psi\rangle + |\Psi^+\rangle \otimes \sigma_x|\psi\rangle + i|\Psi^-\rangle \otimes \sigma_y|\psi\rangle]$$

where $|\psi\rangle$ is an arbitrary single-qubit state. In the expression shown above, the four Bell-basis vectors are superposed with the same probability amplitude. When the above-described Bell measurement using the IFM gate is applied, quantum teleportation can be implemented with maximum probability ¾.

Next, a method for observing an arbitrary two-qubit state:

$$|\Sigma\rangle = c_{00}|\Phi^+\rangle + c_{01}|\Phi^-\rangle + c_{10}|\Psi^+\rangle + c_{11}|\Psi^-\rangle \quad (4.5)$$

where $c_{ij} \in C$(complex number), $\forall i, j \in \{0,1\}$, and $$\sum_{i,j \in \{0,1\}} |c_{ij}|^2 = 1,$$

in the Bell bases $\{|\Phi^\pm\rangle, |\Psi^\pm\rangle\}$ is considered. In the above-described method, $|\Psi^+\rangle$ and $|\Psi^-\rangle$ can be distinguished from each other with probability 1 and $|\Phi^+\rangle$ and $|\Phi^-\rangle$ can be distinguished from each other with probability ½. Accordingly, the Bell bases can be distinguished from one another with average maximum probability ¾ by randomly permuting the basis vectors $\{|\Phi^\pm\rangle, |\Psi^\pm\rangle\}$ and performing the observation.

An example of permutation of the Bell bases will be described below. First, an SU(2) rotation operator around the x, y, and z axes is defined as follows:

$$R_k(\theta) = \exp[-i(\theta/2)\sigma_k], k \in \{x, y, z\}, 0 \leq \theta < 4\pi \quad (4.6)$$

where $\sigma_k (k \in \{x, y, z\})$ represent Pauli matrices:

$$\sigma_x = \begin{pmatrix} 0 & 1 \\ 1 & 0 \end{pmatrix}, \sigma_y = \begin{pmatrix} 0 & -i \\ i & 0 \end{pmatrix}, \text{and } \sigma_z = \begin{pmatrix} 1 & 0 \\ 0 & -1 \end{pmatrix} \quad (4.7)$$

In addition, the following equations are satisfied:

$$R_k(\pi) = -i\sigma_k, R_k(\pi/2) = (1/\sqrt{2})(-i\sigma_k + I), \quad (4.8)$$

-continued
$$I = \begin{pmatrix} 1 & 0 \\ 0 & 1 \end{pmatrix}, k \in \{x, y, z\}$$

Accordingly, from calculations such as:

$$[R_x(\pi/2) \otimes R_x(\pi/2)][R_y(\pi) \otimes I]|\Psi^+\rangle = -|\Phi^-\rangle, \quad (4.9)$$

the following relationship can be obtained:

$$[R_x(\pi/2) \otimes R_x(\pi/2)][R_y(\pi) \otimes I]:$$

$$|\Psi^+\rangle \to -|\Phi^-\rangle, |\Psi^-\rangle \to -i|\Psi^+\rangle$$

$$|\Phi^+\rangle \to -|\Psi^-\rangle, |\Phi^-\rangle \to -i|\Phi^+\rangle \quad (4.10)$$

FIG. 11 is a table showing a random permutation of the Bell-basis vectors $\{|\Phi^\pm\rangle\}$ and $\{|\Psi^\pm\rangle\}$. In FIG. 11, the phase factor is omitted. The six kinds of transformations shown in FIG. 11 permute the two sets of vectors $\{|\Phi^\pm\rangle\}$ and $\{|\Psi^\pm\rangle\}$ into arbitrary combinations. More specifically, a random integer k ($k \in \{1, \ldots, 6\}$) is picked out and the $k^{th}$ transformation in the table of FIG. 11 is applied to $|\Sigma\rangle$. Each of the transformations shown in FIG. 11 is a combination of single-qubit unitary transformations, and can be achieved by beam splitters. Then, the Bell measurement is performed by the quantum circuit shown in FIG. 8.

In the present embodiment, the case in which a positron and an electron are used as two particles is described. However, any kinds of particles may be used as long as one of them absorbs the other when they approach each other.

Fourth Embodiment

In a fourth embodiment, a second example of an apparatus for performing the Bell measurement will be described. First, the Bell states of an electron-positron pair are defined as follows:

$$|\Phi^\pm\rangle = (1/\sqrt{2})(|\bar{0}\rangle_+|\bar{0}\rangle_- \pm |\bar{1}\rangle_+|\bar{1}\rangle_-), \quad (5.1)$$

$$|\Psi^\pm\rangle = (1/\sqrt{2})(|\bar{0}\rangle_+|\bar{1}\rangle_- \pm |\bar{1}\rangle_+|\bar{0}\rangle_-),$$

where $|\bar{0}\rangle_+ = |0\rangle_a|1\rangle_{b'}, |\bar{1}\rangle_+ = |1\rangle_a|0\rangle_{b'}, |\bar{0}\rangle_- = |0\rangle_c|1\rangle_d$ and $|\bar{1}\rangle_- = |1\rangle_c|0\rangle_d$.

The positron travels through paths a and b and the electron travels through path c and d. FIG. 12 shows a quantum circuit for distinguishing the Bell bases $\{|\Phi^\pm\rangle, |\Psi^\pm\rangle\}$ from one another.

The operation of the quantum circuit shown in FIG. 12 will be described below. One of $\{|\Phi^\pm\rangle, |\Psi^\pm\rangle\}$ is input from the paths a, b, c, and d at t=0. When the basis is $|\bar{0}\rangle_+|\bar{0}\rangle_-, |\bar{0}\rangle_+|\bar{1}\rangle_-, |\bar{1}\rangle_+|\bar{0}\rangle_-$, or $|\bar{1}\rangle_+|\bar{1}\rangle_-$ at t=0, it is transformed as shown in FIG. 13 at t=$T_1$ and t=$T_2$. Note that the paths D and E are replaced with each other between t=$T_1$ and t=$T_2$. The paths E and F are observed at t=$T_2$. If the electron is found in the path E, it is determined that the input state is $|\Psi^\pm\rangle$, and if the electron is found in the path F, it is determined that the input state is $|\Phi^\pm\rangle$. The paths C and D are ignored since the electron is never present in the paths C and D and the states thereof are always $|0\rangle_C|0\rangle_D$.

If the electron is found in the path E, $|\Psi^{\pm}\rangle$ is projected into the following state:

$$(1/\sqrt{2})(-|0\rangle_A|1\rangle_B \pm |1\rangle_A|0\rangle_B). \tag{5.2}$$

The operation of the beam splitter H is defined by Expression (2.1), and Expression (5.2) is converted by the beam splitter H as follows:

$$(1/\sqrt{2})(-|0\rangle_A|1\rangle_B \pm |1\rangle_A|0\rangle_B) \xrightarrow{H} \begin{cases} -|1\rangle_A|0\rangle_B & \text{for } |\Psi^+\rangle \\ -|0\rangle_A|1\rangle_B & \text{for } |\Psi^-\rangle \end{cases} \tag{5.3}$$

Accordingly, the input state is $|\Psi^+\rangle$ if the positron is found in the path A at $t=T_3$, and is $|Y^-\rangle$ if the positron is found in the path B at $t=T_3$.

If the electron is found in the path F, $|\Phi^{\pm}\rangle$ is projected into the following state:

$$(1/\sqrt{2})(|0\rangle_A|1\rangle_B \mp |1\rangle_A|0\rangle_B). \tag{5.4}$$

Expression (5.4) is converted by the beam splitter H as follows:

$$(1/\sqrt{2})(|0\rangle_A|1\rangle_B \mp |1\rangle_A|0\rangle_B) \xrightarrow{H} \begin{cases} |1\rangle_A|0\rangle_B & \text{for } |\Phi^+\rangle \\ |0\rangle_A|1\rangle_B & \text{for } |\Phi^-\rangle \end{cases}. \tag{5.5}$$

Accordingly, the input state is $|\Phi^+\rangle$ if the positron is found in the path A at $t=T_3$, and is $|\Phi^-\rangle$ if the positron is found in the path B at $t=T_3$. Thus, the Bell bases $\{|\Phi^{\pm}\rangle, |\Psi^{\pm}\rangle\}$ are distinguished from one another.

In the present embodiment, the case in which a positron and an electron are used as two particles is described. However, any kinds of particles may be used as long as one of them absorbs the other when they approach each other.

Fifth Embodiment

In a fifth embodiment, an apparatus for implementing a controlled-NOT gate transformation will be described.

An apparatus for implementing a controlled-NOT gate transformation according to the present embodiment uses the method proposed by Gottesman and Chuang and implements the controlled-NOT gate indirectly using the above-described Bell-state measurement process. Accordingly, the universal set of gates for quantum computation can be realized by an interaction-free measurement. This means that a desired quantum computation algorithm can be implemented by the interaction-free measurement.

Gottesman and Chuang have proved that the controlled-NOT gate can be implemented by generating a four-qubit entangled state expressed as:

$$|\chi\rangle=(\frac{1}{2})[(|00\rangle+|11\rangle)|00\rangle+(|01\rangle+|10\rangle)|11\rangle] \tag{6.1}$$

and performing the Bell measurement twice and single-qubit gate operations (D. Gottesman and I. L. Chuang, "Demonstrating the viability of universal quantum computation using teleportation and single-qubit operations", Nature (London) 402, 390–393 (1999)). First, a method for generating the state $|\chi\rangle$ using IFM gates will be discussed.

First, a GHZ state is generated by the quantum circuit shown in FIG. 5, and is input to three pairs of paths (three qubits) of a quantum circuit shown in FIG. 14. The quantum circuit shown in FIG. 14 is used to generate the state $|\chi\rangle$.

Next, each of the three qubits is subjected to the Hadamard transformation using a beam splitter H. The operation of the beam splitters H is expressed as $|\bar{0}\rangle_{\pm} \to (1/mt;epmrl;\sqrt{2rlxmx})(|\bar{0}\rangle_{\pm}+|\bar{1}\rangle_{\pm})$ and $|\bar{1}\rangle_{\pm} \to (1/mt;epmrl;\sqrt{2rlxmx})(|\bar{0}\rangle_{\pm}-|\bar{1}\rangle_{\pm})$, and accordingly the following expression is obtained:

$$(1/\sqrt{2})(|\bar{0}\rangle_+|\bar{0}\rangle_-|\bar{0}\rangle_+ + |\bar{1}\rangle_+|\bar{1}\rangle_-|\bar{1}\rangle_+)$$

$H\otimes H\otimes H$:

$$\to (1/2)[(|\bar{0}\rangle_+|\bar{0}\rangle_- + |\bar{1}\rangle_+)|\bar{1}\rangle_-)| \tag{6.2}$$

$$\bar{0}\rangle_+ + (|\bar{0}\rangle_+|\bar{1}\rangle_- + |\bar{1}\rangle_+|\bar{0}\rangle_-)|\bar{1}\rangle_+]$$

Then, $|\bar{0}\rangle_-$ is added as a fourth qubit, and the third and the fourth qubits are input to an IFM gate. As is understood from FIG. 9, when the control qubit is a positron and the target qubit is an electron, the IFM gate performs the transformation expressed as $|\bar{0}\rangle_+|\bar{0}\rangle_- \to |\bar{0}\rangle_+|\bar{0}\rangle_-$ and $|\bar{1}\rangle_+|\bar{0}\rangle_- \to |\bar{1}\rangle_+|\bar{1}\rangle_-$, and accordingly the following expression is obtained:

$$(1/2)[(|\bar{0}\rangle_+|\bar{0}\rangle_- + |\bar{1}\rangle_+|\bar{1}\rangle_-)|\bar{0}\rangle_+ + (|\bar{0}\rangle_+|\bar{1}\rangle_- + |\bar{1}\rangle_+|\bar{0}\rangle_-)|\bar{1}\rangle_+]|\bar{0}\rangle_-$$

IFM gate:

$$\to (1/2)[(|\bar{0}\rangle_+|\bar{0}\rangle_- + |\bar{1}\rangle_+|\bar{1}\rangle_-)|\bar{0}\rangle_+|\bar{0}\rangle_- + \tag{6.3}$$

$$(|\bar{0}\rangle_+|\bar{1}\rangle_- + |\bar{1}\rangle_+|\bar{0}\rangle_-)|\bar{1}\rangle_+|\bar{1}\rangle_-]$$

Thus, if an ideal IFM gate (fidelity=1) can be obtained, the state $|\chi\rangle$ is generated with probability 1.

Figure 15:
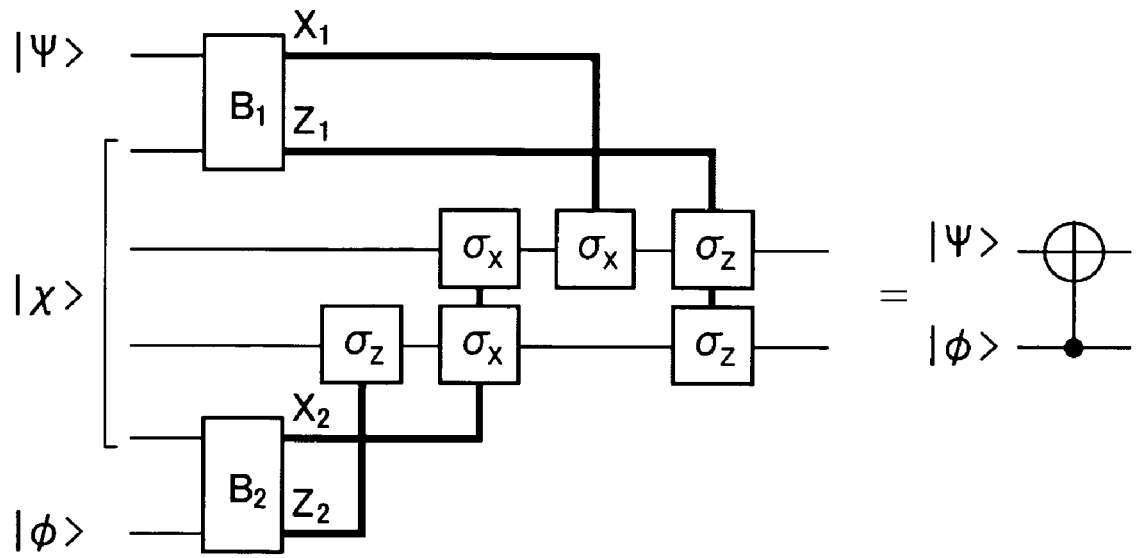
FIG. 15 is a diagram showing the construction of a controlled-NOT gate according to Gottesman and Chuang.

A method for implementing the controlled-NOT gate according to Gottesman and Chuang is shown in FIG. 15. The thin lines show the paths of qubits, and the bold lines show the paths of classical bits. Reference symbols $B_1$ and $B_2$ denote the Bell measurement. The output of $B_i(i\epsilon\{1,2\})$ is represented by two classical bits. More specifically, $|\Phi^+\rangle$, $|\Phi^-\rangle$, $|\Psi^+\rangle$, and $|\Psi^-\rangle$ are represented by $(x_i, z_i)=(0,0), (0,1), (1,0)$, and $(1,1)$, respectively. $\sigma_x$ is operated when $x_i=1$, and $\sigma_z$ is operated when $z_i=1$. In addition, no operation is performed when $x_i=0$ and $z_i=0$. The single-qubit unitary transformations such as $\sigma_x$ and $\sigma_z$ can be achieved by beam splitters.

The Bell measurement in FIG. 15 may be performed by either of the method according to the third embodiment and that of the fourth embodiment.

First, the case in which the Bell measurement in FIG. 15 is performed by the method according to the third embodiment will be described. In this case, the maximum fidelity of a single Bell measurement is ¾. Since the Bell measurement is performed twice in FIG. 15, the maximum fidelity of the controlled-NOT gate is $(¾)^2=9/16>½$.

Next, the case in which the Bell measurement in FIG. 15 is performed by the method according to the fourth embodiment will be described. In this case, the maximum fidelity of a single Bell measurement is 1. Accordingly, the maximum fidelity of the controlled-NOT gate is also 1.

Figure 16:
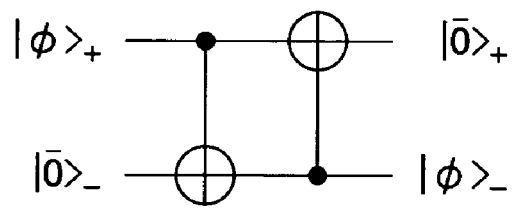
FIG. 16 is a diagram showing the exchange of wave functions between a positron and an electron.

From the above discussions, it is understood that the controlled-NOT gate between an arbitrary state of a positron $\forall|\psi\rangle_+$ and an arbitrary state of an electron $\forall|\phi\rangle_-$ can be implemented using IFM gates and beam splitters. Next, a method for implementing the controlled-NOT gate between two states of positrons $\forall|\psi>_+$ and $\forall|\phi>_+$ is considered. In this case, a technique shown in FIG. 16 is used. More specifically, when the state of a positron $|\phi>_+$ and the state of an auxiliary system $|\bar{0}>_-$ are processed by the controlled-NOT gate twice, as shown in FIG. 16, the wave functions are exchanged and $|\bar{0}>_+$ and $|\phi>_-$ are obtained. Accordingly, $|\psi>_+$ and $|\phi>_-$ can be input to the controlled-NOT gate.

In the present embodiment, the case in which a positron and an electron are used as two particles is described. However, any kinds of particles may be used as long as one of them absorbs the other when they approach each other.

Sixth Embodiment

In a sixth embodiment, apparatuses for generating the Bell state, performing the Bell measurement, and implementing the controlled-NOT gate transformation using an electron and a positron as two particles will be described.

In first, third, fourth and fifth embodiments, the interaction-free measurement using an electron and a positron is considered. Generally, the electron and the positron are generated using an accelerator. Therefore, in the apparatuses for generating the Bell state, performing the Bell measurement, and implementing the controlled-NOT gate, the interferometer according to Kwiat et al., the beam splitters, and the paths through which the electron and the positron travel are contained in a vacuum vessel.

Figure 17:
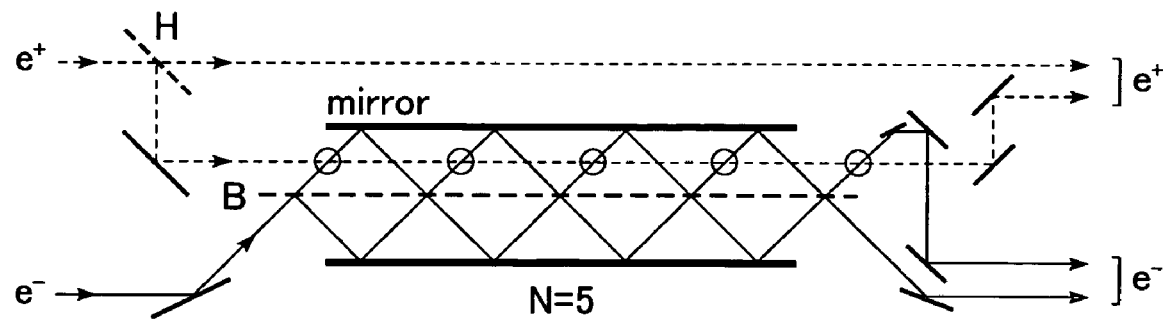
FIG. 17 is a diagram showing an apparatus for generating the Bell state of a positron-electron pair.

FIG. 17 is a diagram of a system corresponding to the quantum circuit for generating the Bell state shown in FIG. 1, which is contained in a vacuum vessel. The interferometer according to Kwiat et al. shown in FIG. 17 includes five beam splitters. The speeds and paths of the electron and the positron are adjusted such that the electron and the positron come near enough to each other at positions shown by the circles.

Mirrors and beam splitters included in the interferometer may be composed of metal or insulating plates which function as potential barriers for the electron and the positron, metal electrodes with a suitable potential, etc. The reflectance, the transmittance, and the phase shift of the beam splitters are adjusted by the potential barriers.

Seventh Embodiment

In a seventh embodiment, apparatuses for generating the Bell state, performing the Bell measurement, and implementing the controlled-NOT gate transformation using an electron and a hole in a semiconductor will be described.

In first, third, fourth and fifth embodiments, the interaction-free measurement using an electron and a positron is considered. However, any kinds of particles may be used as long as one of them absorbs the other when they approach each other. For example, when a conducting electron and a hole in a semiconductor approach each other, pair annihilation occurs and a photon is generated. Accordingly, the Bell measurement and the controlled-NOT gate may also be realized by an interaction-free measurement using the electron and the hole in the semiconductor. In such a case, the beam splitters may be composed of insulating layers or the like which function as suitable potential barriers for the electron or the hole, and the reflective mirrors may be obtained by controlling potentials using metal electrodes. The reflectance, the transmittance, and the phase shift of the beam splitters are adjusted by the potential barriers.

Eighth Embodiment

In an eighth embodiment, an approximate formula used for evaluating the fidelity of an IFM gate when the absorption probability of an object is less than 1 will be described.

The above-described IFM gate includes the beam splitters and uses the interaction between a photon and an absorbing object. The beam splitters are commonly used as experimental components, and those with high precision are available. In comparison, the absorbing object cannot be expected to absorb the photon with probability 1 when the photon approaches the absorbing object. Accordingly, in the present embodiment, the responsibility of the IFM gate is evaluated on the assumption that the absorbing object absorbs the photon with probability $(1-\eta)$ and fails to absorb the photon with probability $\eta$ when the photon approaches the absorbing object.

Accordingly, in the interferometer shown in FIG. 22, the state in which the photon comes out from the beam splitters into the path a, that is, the state $|\bar{0}>=|1>_a|0>_b$, is transformed as follows:

$$|\bar{0}> \rightarrow \sqrt{\eta}|\bar{0}> + \sqrt{1-\eta}|\text{absorption}>, \ 0<\eta<1 \quad (7.1)$$

where |absorption> is the state in which the photon is absorbed by the object. |absorption> is orthogonal to $\{|\bar{0}>, |\bar{1}>\}$ and is standardized, where $|\bar{0}>=|1>_a|0>_b$ and $|\bar{1}>=|0>_a|1>_b$. When an electron-positron pair is used, |absorption> corresponds to the state in which the photon $\gamma$ is generated. In addition, when a photon-atom reaction is used, |absorption> means that the atom is in the state $|e_2>$.

For convenience, the transformation of the photon is expressed by a matrix with the basis $\{|\bar{0}>, |\bar{1}>\}$ as follows:

$$|\bar{0}\rangle = |1\rangle_a|0\rangle_b = \begin{pmatrix} 1 \\ 0 \end{pmatrix}, \ |\bar{1}\rangle = |0\rangle_a|1\rangle_b = \begin{pmatrix} 0 \\ 1 \end{pmatrix} \quad (7.2)$$

Accordingly, Expression (1.3), which defines the operation of the beam splitter B, is rewritten as follows:

$$B = \begin{pmatrix} \cos\theta & \sin\theta \\ -\sin\theta & \cos\theta \end{pmatrix}, \ \theta = \pi/2N \quad (7.3)$$

In addition, Expression (7.1), which shows the absorption process of the photon, is also rewritten as follows:

$$A = \begin{pmatrix} \sqrt{\eta} & 0 \\ 0 & 1 \end{pmatrix}, \ 0<\eta<1 \quad (7.4)$$

Since Expression (7.1) involves the dissipation (annihilation) of the photon, A is not unitary. The probability that the photon input as $|\bar{1}>=|0>_a|1>_b$ will be detected as $|\bar{1}>=|0>_a|1>_b$ after passing through the N beam splitters is calculated as follows:

$$P = |<\bar{1}|(BA)^{N-1}B|\bar{1}>|^2 \quad (7.5)$$

Figure 18:
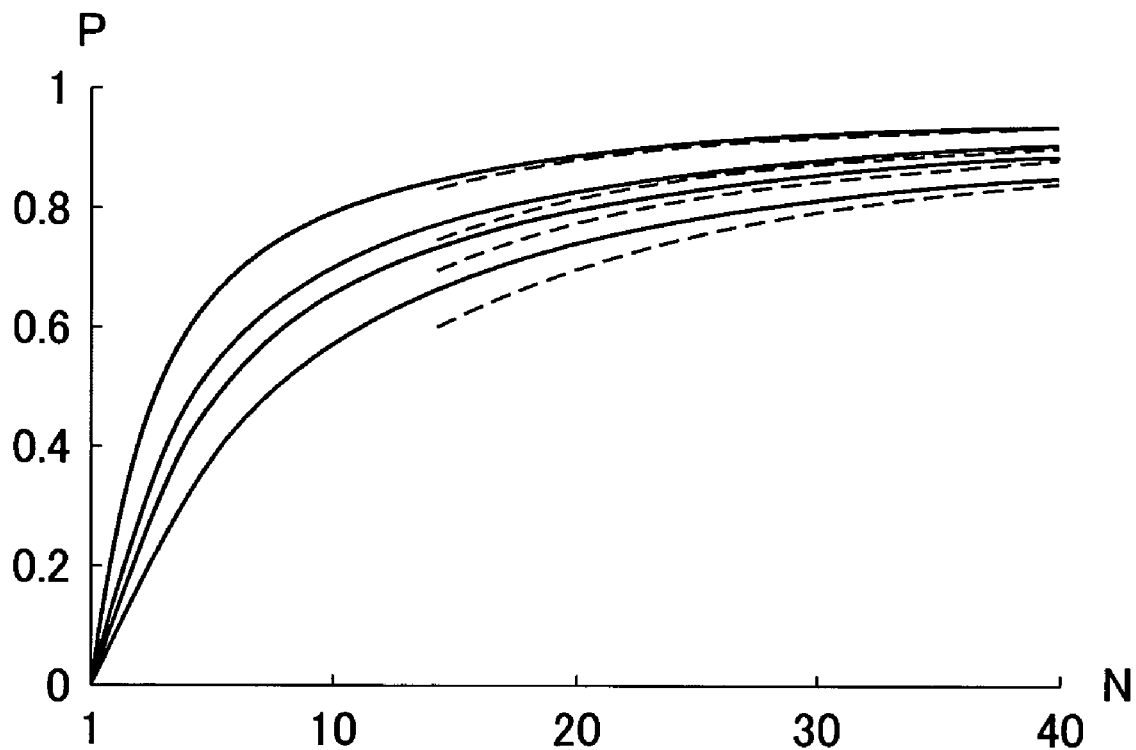
FIG. 18 is a graph of the fidelity of the IFM gate plotted as a function of the number N of beam splitters and the probability η that an absorbing object will fail to absorb a photon.

The IFM gate operates correctly at least with probability P. FIG. 18 is a graph showing lines obtained by connecting the results of numerical calculations of the probability P as a function of N and $\eta$ using Expressions (7.3), (7.4), and (7.5).

More specifically, FIG. 18 is a graph of the fidelity of the IFM gate plotted as a function of the number N of beam splitters (the number of times the particle B hits the beam splitters) and the probability η that the absorbing object (particle A) will fail of absorb the photon (particle B). The bold lines show the results of exact numerical calculations, and the dashed lines show the results obtained by the approximate formula satisfied when N is large. The four bold lines correspond to η=0, 0.05, 0.1, and 0.2 from the top.

In order to evaluate the influence of the noise η on the responsibility of the IFM gate, the change which occurs in the probability P when η is fixed to a finite value and N is increased to infinity (N→∞) will be discussed below. The evaluation of the probability P obtained by Expression (7.5) under the condition N→∞ is difficult in that the dependence of P on N comes from θ=π/2N in the matrix B in Expression (7.3) and the exponent N of $(BA)^{N-1}$ in Expression (7.5).

With regard to θ=π/2N in the matrix B, the expression may be expanded in powers of θ and high-order items may be ignored. Accordingly, in Expressions (7.3), (7.4), and (7.5), η is fixed to a value in the range of 0<η<1 and the powers of θ up to the second order are calculated under the condition θ=π/2N→0. First, $$B = \begin{pmatrix} 1-(\theta^2/2) & \theta \\ -\theta & 1-(\theta^2/2) \end{pmatrix} + O(\theta^3) \quad (7.6)$$

is obtained, and $$(BA)^k = \quad (7.7)$$

$$\begin{pmatrix} \sqrt{\eta}^k - \theta^2 \left[ \sum_{l=1}^{k-1} l\sqrt{\eta}^l + (k/2)\sqrt{\eta}^k \right] & \theta \sum_{l=0}^{k-1} \sqrt{\eta}^l \\ -\theta \sum_{l=0}^{k-1} \sqrt{\eta}^{l+1} & 1 - \theta^2 \left[ \sum_{l=1}^{k-1} l\sqrt{\eta}^{k-l} + (k/2) \right] \end{pmatrix} + O(\theta^3)$$

where k=1, 2, . . . , is obtained by induction ($\sum_{l=1}^{0}$ means that the sum is not calculated).

means that the sum is not calculated). Accordingly, the amplitude of the photon at the path $|\bar{T}\rangle=|0\rangle_a|1\rangle_b$ after passing through the N beam splitters is expressed as follows:

$$\langle \bar{T}|(BA)^{N-1}B|\bar{T}\rangle = \quad (7.8)$$

$$1 - \theta^2 \left[ (N/2) + \sum_{l=0}^{N-2} \sqrt{\eta}^{l+1} + \sum_{l=1}^{N-2} l\sqrt{\eta}^{N-1-l} \right] + O(\theta^3) =$$

$$1 - \theta^2 \left[ (N/2) + N\sum_{l=1}^{N-1} \sqrt{\eta}^l - \sum_{l=1}^{N-1} l\sqrt{\eta}^l \right] + O(\theta^3) =$$

-continued $$1 - (\pi/2)^2 (1/N) \left[ (1/2) + \frac{\sqrt{\eta}(1-\sqrt{\eta}^{N-1})}{1-\sqrt{\eta}} - (1/N)\frac{\sqrt{\eta}\left[1 - N\sqrt{\eta}^{N-1} + (N-1)\sqrt{\eta}^N\right]}{(1-\sqrt{\eta})^2} \right] + O(\theta^3)$$

where N=2, 3, . . . In the above transformation, the following formulas are applied:

$$\sum_{k=1}^{N} x^k = x(1-x^N)/(1-x) \quad (7.9)$$

$$\sum_{k=1}^{N} kx^k = x[1-(N+1)x^N + Nx^{N+1}]/(1-x)^2 \quad (7.10)$$

Expression (7.8) is regarded as the approximate formula of $\langle \bar{T}|(BA)^{N-1}B|\bar{T}\rangle$, where N is sufficiently large. Note that $O(\theta^3)$ in Expression (7.8) may include a $(1/N)^{th}$-order term. Accordingly, Expression (7.8) cannot be regarded as an approximate formula up to the $(1/N)^{th}$ order.

In FIG. 18, the dashed lines are obtained by connecting the results obtained by the approximate formula of $P=|\langle \bar{T}|(BA)^{N-1}B|\bar{T}\rangle|^2$ calculated using Equation (7.8) as a function of N and η (the four dashed lines correspond to η=0, 0.05, 0.1, and 0.2 from the top). As is clear from FIG. 18, the results of approximation of P obtained using Expression (7.8) is close to those obtained by the exact numerical calculations when N is large.

As is understood from FIG. 18, for any of η=0, 0.05, 0.1, and 0.2, $P=|\langle \bar{T}|(BA)^{N-1}B|\bar{T}\rangle|^2$ approaches 1 as N increases. This means that if there is no limit to the number of beam splitters, the influence of noise calculated by Expression (7.1) can be eliminated. When the transmittance of the beam splitters is set sufficiently low (when N is sufficiently large and θ is sufficiently small), the probability that the photon will approach the absorbing object reduces, and accordingly the influence of the probability η that the object will fail to absorb the photon also reduces. When N is extremely large, the transmittance $T=\sin^2(\pi/2N)$ of the beam splitters is set extremely low, which is equivalent to the case where beam splitters with $T=\sin^2(\pi/2N)\sim(1/N^2)$ are provided. This can be interpreted as the noise in the interaction between the photon and the object being compensated for by the precision of the beam splitter.

Next, the number N of beam splitters required for increasing the fidelity of the IFM gate to a predetermined value P(0<∀P<1) will be determined as a function of η. If N suddenly increases as η starts to increase from 0, the anti-noise performance of the IFM gate is relatively low.

An approximate formula of Expression (7.8) is used for the above evaluation. In Expression (7.8), it is assumed that η is relatively low and $N\sqrt{\eta}^N \ll 1$ is satisfied when N is sufficiently large. In this case, P can be simply expressed as follows:

$$P \sim 1 - (\pi^2/2N)\left[(1/2) + \frac{\sqrt{\eta}}{1-\sqrt{\eta}}\right] \quad (7.11)$$

-continued

Figure 19:
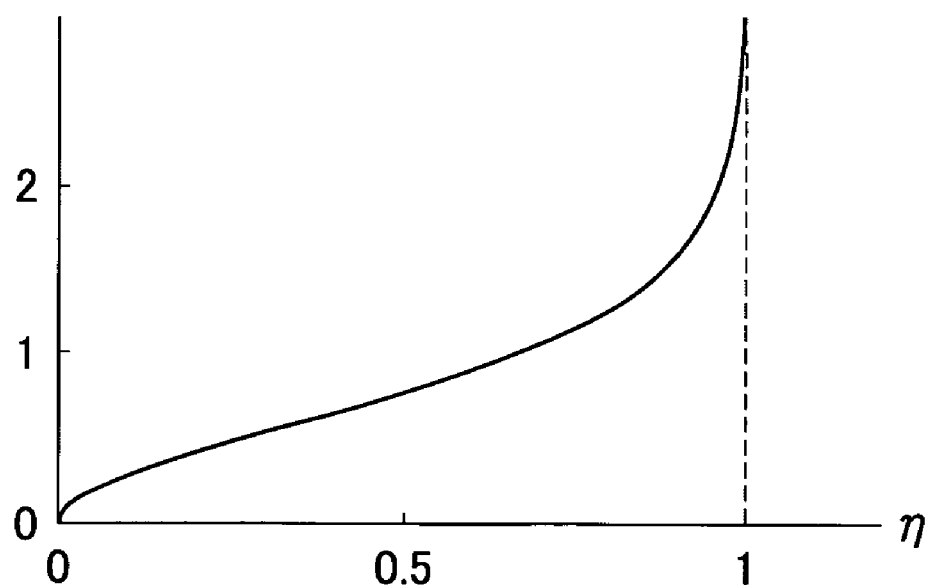
FIG. 19 is a graph of the number N of beam splitters required for obtaining an IFM gate with a desired fidelity plotted as a function of the probability η that the absorbing object will fail to absorb the photon.

Accordingly, $$N \sim (1/2)[\pi^2/(1-P)]\frac{1+\sqrt{\eta}}{1-\sqrt{\eta}} \text{ or} \quad (7.12)$$

$$\log\frac{1+\sqrt{\eta}}{1-\sqrt{\eta}} \sim \log N + Const \quad (7.13)$$

where Const=log [2(1−P)/π²] is obtained. Expression (7.13) is satisfied when P is sufficiently close to 1, that is, when N is sufficiently large. A graph of Expression (7.13) is shown in FIG. 19, in which the number N of beam splitters (the number of times the particle B hits the beam splitter) required for increasing the fidelity of the IFM gate to the predetermined value is plotted as a function of the probability η that the absorbing object (particle A) will fail to absorb the photon (particle B). The vertical axis of the graph is drawn with a logarithmic scale. In Expressions (7.11) and (7.13), N suddenly increases as η increases, and diverges to infinity (N→∞) when η→1. For example, N obtained when η=¼ is three times of that obtained when η=0.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An apparatus for generating a quantum state of a two-qubit system including two qubits, each qubit being represented by a detector probability, where the probability is based upon N samples of a system in which a particle invariably travels through one of two paths, the apparatus comprising:
   a first beam splitter configured to receive a first particle of two particles having no correlation with each other, and to output the first particle into two paths in a superposition; and
   an interferometer configured to implement an interaction-free measurement, wherein an interaction-free measurement is a probability measurement method defined as:
   the condition when, after the N samples of the system containing the two particles, the probability of detection of a particle after N samples by a detector is about $P_C=\cos^2\theta \sin^2\theta$, wherein N is defined as $N=1/(1-P^B)$ $=1/(1-\cos^4\theta)$, wherein θ is a characteristic of the first beam splitter, wherein $P=\cos^4\theta$, and wherein the interferometer is configured to receive a second particle of the two particles and the output of the first beam splitter and generates a Bell state with asymptotic probability 1.

2. An apparatus according to claim 1, wherein the interferometer includes a cavity and second beam splitters sectioning the cavity into two chambers,
   wherein the two particles are input into different chambers of the cavity, the first particle absorbing the second particle if the first particle and the second particle come near enough to each other, and
   wherein the second particle successively hits the second beam splitters so that the transmitted wave component in the wave function of the second particle travels back and forth between the two chambers.

3. An apparatus according to claim 2, wherein the particle transmittance of the second beam splitters is set to a predetermined value or less so that the probability amplitude of the state in which the second particle is absorbed by the first particle by entering the chamber containing the first particle when the second particle hits each of the beam splitter is set small, and
   wherein the first and the second particles repeatedly approach each other with an extremely small probability amplitude so that the first particle absorbs the second particle with probability close to zero,
   whereby the second particle is put into different chambers depending on whether the first particle is input to the cavity.

4. An apparatus according to claim 3, wherein the first beam splitter outputs the first particle to one of the chambers while the first particle is in a quantum superposition of present and absent states, so that the first particle and the second particle are put into the Bell state with asymptotic probability 1.

5. An apparatus according to claim 3, wherein the first beam splitter implements a Hadamard transformation and thereby inputs the first particle to one of the chambers while the first particle is in a quantum superposition of present and absent states, so that the Bell state is generated with asymptotic probability 1 if the number of times the second particle hits the beam splitters in the interferometer is large.

6. An apparatus according to claim 3, wherein the two particles are photons and the Bell state is generated using an auxiliary system including a three-level atom by regarding a ground state in which the atom can absorb the photons as a state in which the second particle is absorbed by the first particle and a first excited state in which the atom cannot absorb the photons as a state in which the second particle is not absorbed by the first particle.

7. An apparatus according to claim 6, wherein a transition of the atom between the ground state and the first excited state is implemented by Rabi oscillation, and the energy of the two photons is the same as the difference in energy level between the ground state and a second excited state of the atom.

8. An apparatus according to claim 3, wherein the two particles are a positron and an electron and the Bell state is generated by regarding a state in which a photon is generated by pair annihilation of the positron and the electron as the state in which the second particle is absorbed by the first particle, the pair annihilation occurring if the positron and the electron come near enough to each other.

9. An apparatus according to claim 3, wherein the two particles are a hole in a semiconductor and a conducting electron and the Bell state is generated by regarding a state in which a photon is generated by pair annihilation of the hole and the conducting electron as the state in which the second particle is absorbed by the first particle, the pair annihilation occurring if the hole and the conducting electron come near enough to each other.

* * * * *